United States Patent
Ducceschi et al.

(10) Patent No.: US 11,448,342 B2
(45) Date of Patent: Sep. 20, 2022

(54) METHODS AND APPARATUS RELATING TO PIPE WELDING

(71) Applicant: Saipem S.p.A., Milanese (IT)

(72) Inventors: Matteo Ducceschi, Milan (IT); Nicola D'Incecco, Milan (IT); Carlo Galietti, Milan (IT); Paolo Nonne, Milan (IT); Lorenzo Penati, Milan (IT); Luca Cevasco, Milan (IT); Diego Parazzoli, Milan (IT)

(73) Assignee: SAIPEM S.P.A., Milan (IT)

( * ) Notice: Subject to any disclaimer, the term of this patent is extended or adjusted under 35 U.S.C. 154(b) by 150 days.

(21) Appl. No.: 16/765,723

(22) PCT Filed: Nov. 22, 2018

(86) PCT No.: PCT/EP2018/082277
§ 371 (c)(1),
(2) Date: May 20, 2020

(87) PCT Pub. No.: WO2019/101889
PCT Pub. Date: May 31, 2019

(65) Prior Publication Data
US 2020/0292102 A1    Sep. 17, 2020

(30) Foreign Application Priority Data

Nov. 24, 2017   (GB) ..................... 1719594

(51) Int. Cl.
*F16L 1/19*    (2006.01)
*F16L 1/20*    (2006.01)
(Continued)

(52) U.S. Cl.
CPC ............. *F16L 1/207* (2013.01); *F16L 1/19* (2013.01); *B23K 9/0282* (2013.01);
(Continued)

(58) Field of Classification Search
CPC .... B23K 2101/10; B23K 9/0282; B63B 35/03
See application file for complete search history.

(56) References Cited

U.S. PATENT DOCUMENTS 5,981,905 A    11/1999  Ohmi et al.
7,713,000 B2 *  5/2010  Verkuijl ................. G01B 21/24
                                                    405/170
(Continued)

FOREIGN PATENT DOCUMENTS

DE    29903371 U1    5/1999
DE    19918779 A1    9/2000
(Continued)

OTHER PUBLICATIONS

"OMS Surveys Pipe for Technip", Automation.com, Oct. 13, 2011. (3 pages).
(Continued)

*Primary Examiner* — Sean D Andrish
(74) *Attorney, Agent, or Firm* — Buchanan Ingersoll & Rooney PC

(57) ABSTRACT

A method of aligning first and second pipes end-to-end in a position ready for welding. Each pipe has an end bevelled with a shape scanned and stored in memory of a control unit. At least one of the pipes has machine readable codes distributed around their circumference of the pipe. The method includes effecting relative movement of the ends of the first and second pipes towards each other, reading at least one of the codes with a reader, and ascertaining the relative movement required to align the pipes in accordance with a target orientation. The relative movement is ascertained with information provided by the read code and the shapes of the bevelled ends stored in the control unit memory. In other aspects, a closed loop control method and machine-learning may be used to align the pipes. A pipe-laying vessel includ- (Continued)

ing pipe handling equipment and the control unit is also provided.

21 Claims, 12 Drawing Sheets

(51) Int. Cl.
    *B23K 103/04*     (2006.01)
    *B23K 101/06*     (2006.01)
    *B23K 101/10*     (2006.01)
    *B23K 9/028*     (2006.01)
    *B63B 35/03*     (2006.01)

(52) U.S. Cl.
    CPC ...... *B23K 2101/06* (2018.08); *B23K 2101/10* (2018.08); *B23K 2103/04* (2018.08); *B63B 35/03* (2013.01)

(56) References Cited

U.S. PATENT DOCUMENTS

| | | | | |
|---|---|---|---|---|
| 2011/0198316 A1* | 8/2011 | Legori | ............... | G01B 11/2755 219/61.1 |
| 2013/0283628 A1* | 10/2013 | Topueth | ............ | G01B 11/2408 33/550 |
| 2015/0116728 A1* | 4/2015 | Lacome | ............... | G01B 11/002 356/601 |
| 2017/0234806 A1* | 8/2017 | Bueno | .................. | G01S 7/4818 356/607 |
| 2018/0001389 A1 | 1/2018 | Atin et al. | | |

FOREIGN PATENT DOCUMENTS

| | | |
|---|---|---|
| DE | 202005015714 U1 | 2/2007 |
| EP | 0816008 A1 | 1/1998 |
| GB | 2446380 A | 8/2008 |
| GB | 2534382 A | 7/2016 |
| JP | 4378593 B2 | 12/2009 |
| JP | 6178692 B2 | 8/2017 |
| WO | 2005001795 A2 | 1/2005 |
| WO | 2006112689 A1 | 10/2006 |
| WO | 2008030079 A1 | 3/2008 |
| WO | 2009148304 A1 | 12/2009 |
| WO | 2010046390 A1 | 4/2010 |
| WO | 2016026969 A1 | 2/2016 |
| WO | 2018002964 A1 | 1/2018 |

OTHER PUBLICATIONS

UT3 The Magazine of the Society for Underwater Technology, May 2012. (3 pages).

International Search Report (PCT/ISA/210) dated Jan. 4, 2019, by the European Patent Office as the International Searching Authority for International Application No. PCT/EP2018/082277.

Patents Act 1977: Search Report under Section 17 dated May 3, 2018, issued in the corresponding application GB 1719594.2. (5 pages).

Written Opinion (PCT/ISA/237) dated Jan. 4, 2019, by the European Patent Office as the International Searching Authority for International Application No. PCT/EP2018/082277.

* cited by examiner

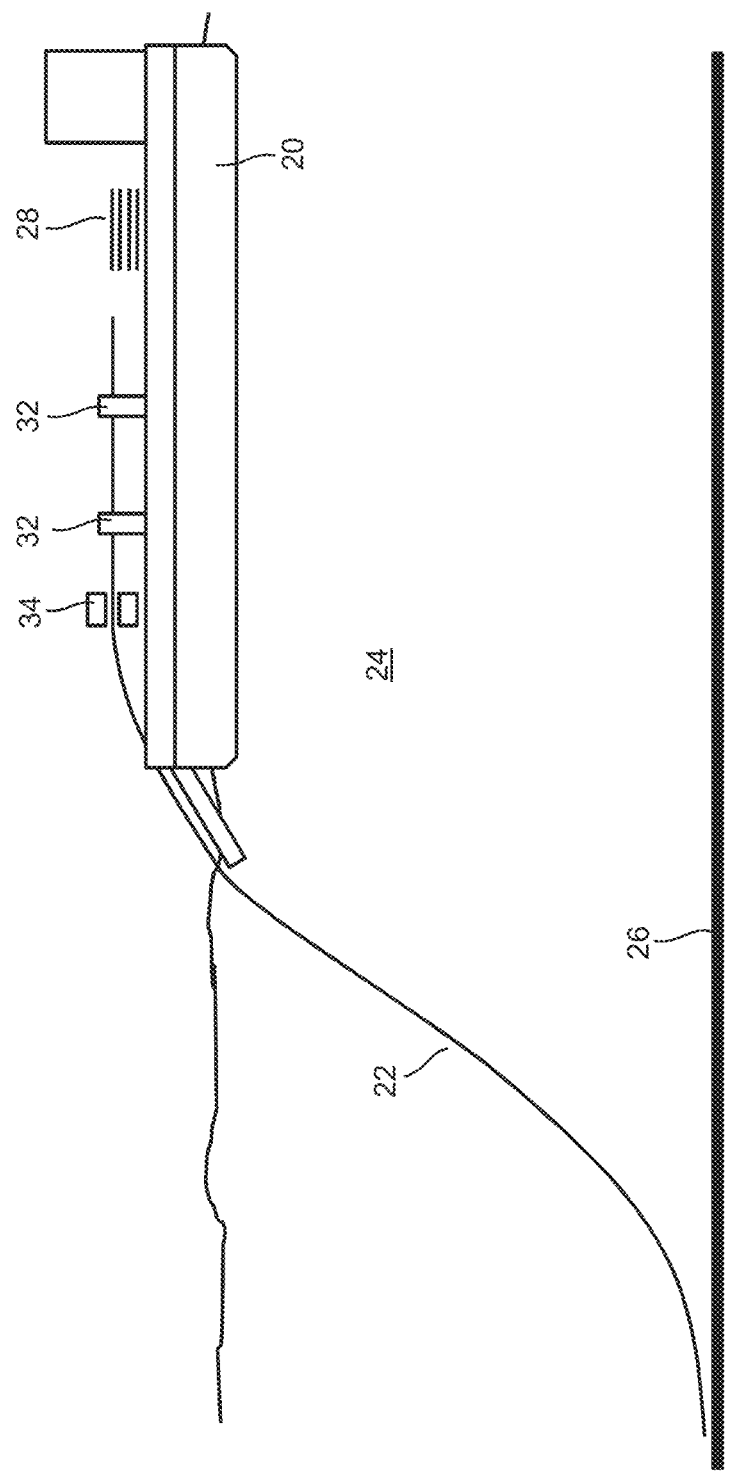

METHODS AND APPARATUS RELATING TO PIPE WELDING

FIELD OF THE INVENTION

The present invention concerns methods and apparatuses relating to pipe welding, for example when joining sections of pipe. More particularly, but not exclusively, this invention concerns a method of aligning a pipe and a pipeline, a method of preparing a pipe for use in a method of laying a pipeline, a pipe laying vessel and other related methods and apparatuses.

BACKGROUND OF THE INVENTION

Pipelines for the transportation of oil and gas must often be laid in water, for example at sea. Typically, when laying a pipeline at sea, one end of the pipeline (sometimes referred to as the string) is held by a pipeline laying vessel and a section of pipe is welded onto the end of the pipeline, at a location on the vessel commonly referred to as the firing line. The lengthened pipeline is then fed off the vessel and the process can be repeated. During the laying process the pipeline is subject to high tensile loads. Tensioners are provided on the vessel to hold, and pay-out, the pipeline under tension. The loads between the pipe and the pipeline laying vessel and between the pipe and the seabed cause the pipeline to deform as it is being laid. The pipeline may also be subject to fatigue loading due to the motion of the sea and the pipeline laying vessel. Additionally, in some applications, the pipeline remains suspended throughout the lifetime of the pipeline and is continuously subjected to marine currents and movements which lead to further fatigue stress. To withstand this loading and stress the weld joints between adjacent sections of pipe typically need to be of a high quality.

When laying pipelines in water, e.g. at sea, a "J-lay" process may be employed, in which the end of the pipeline is held in a substantially vertical (i.e. vertical or close to vertical) position by the pipeline laying vessel or an "S-lay" process may be employed, in which the extreme end of the pipeline is held in a horizontal or close to horizontal orientation on the pipeline laying vessel. Pipe-laying processes other than "S-lay" and "J-lay" are known in the art. In "J-lay" the pipe forms a large J-like shape before touching down on the seabed, whereas in "S-lay" the pipe forms a sigmoid-like shape before touching down on the seabed. The present invention has particular application in relation to S-lay pipe laying operations. During S-lay pipe laying at sea, the pipeline is held under tension on the vessel, the tension being maintained by the vessel with the combination of tensioner equipment on the vessel and pull created by the vessel's thruster(s) or anchor(s). The vessel is subjected to loads by the environmental force and must be able to accommodate surges without over-loading the pipeline.

Pipeline laying operations at sea typically have high running costs; as a result it is desirable to reduce the time it takes to align pipes in a position ready for welding in order to increase the rate at which the pipeline can be laid. The cost per hour of operating a pipe laying vessel at sea is significant. There is therefore a desire to increase the speed at which pipeline is laid. However, quality is also key. Welded joints between sections of pipe in the pipeline must be of high quality. There is therefore a desire to attain a certain level of accuracy of alignment of pipes before and during welding. Improving the accuracy of alignment will improve the quality of the welded joint. Ensuring extremely high weld quality and confidence in that quality is of the utmost importance when laying gas/oil pipeline at sea in circumstances when the pipeline will be under very high tension and/or will be subject to significant fatigue loading when being laid and/or when operational. Ensuring extremely high quality and confidence is also important when laying pipeline that will carry any highly corrosive substances in operation, such as so-called "sour" services. Sour services are typically carried by clad pipes (which may for example include a corrosion resistant inner lining) and/or pipes comprising CRA alloys (Corrosion Resistant Alloys)

In a typical pipe-laying process, new sections of pipe are aligned to the end of the pipeline on the basis of a visual measurement performed or overseen by a human operator. Traditionally, the positions of the pipes' bevels are visually checked by the operator and, if misaligned, the relative positions of the pipes are changed by the operator to improve their alignment (with the assistance of pipe handling equipment for example). Such a manual alignment process can take a considerable amount of time, and requires there to be a skilled man-in-the-loop (the experienced operator). The quality of the weld is significantly affected by the alignment of the pipes in the vicinity of the weld. Weld quality is also affected if there is any significant residual gap between pipes. It is desirable to reduce the time it takes to align a new section of pipe with the end of the pipeline to which it is to be welded. It is also desirable to measure the degree of alignment before and/or after welding to ensure and then confirm that the alignment is within permissible tolerances.

One such measure of pipe alignment, at a given location on the joint to be welded, is the "high-low value" (or just "hi-lo"). The hi-lo is the distance, in the radial direction, between two corresponding positions on two adjacent pipe end-faces.

The ends of pipes are typically machined prior to welding to form a particular cross-sectional shape to assist with the welding process. Such machining is often referred to as bevelling. Depending on the reference point it is thus possible to refer to several different hi-lo values. FIG. 1a shows a partial cross section view of two sections of pipe 10a, 10b arranged end-to-end, with the exterior of the pipe being denoted by the reference "E" and the interior of the pipe being denoted by the reference "I". The pipes are machined ("bevelled") so that a joint 14 to be welded is defined between the ends of the sections of pipe. FIG. 1b is an enlarged view of the portion labelled as 1b in FIG. 1a. Thus, the exterior E of the pipe is uppermost in FIG. 1b and the interior I of the pipes is lowermost. FIG. 1b shows: the hi-lo d1 at the weld cap on the outside diameters of the pipe ends (the "external cap hi-lo"); hi-lo d2 at the weld root, between the outside diameters of the bevel noses 12a, 12b (the "external root hi-lo"); and hi-lo d3 between the inside diameters of both pipe ends (the "internal hi-lo"). In a particular radial direction the values of hi-lo d1, d2, d3 may differ due to slight differences in the pipe thicknesses or bevel geometry of the two neighbouring pipe ends 10a 10b. The hi-lo value may also vary around the circumference of the pipes. This may be due to misalignment of the pipes' axes and/or deviations of the pipes' perimeters from a circular shape ("Out Of Roundness" which may sometimes be abbreviated to "OOR"). It is often the case that the most important hi-lo measurement to ascertain and to seek to reduce and/or minimise is the internal hi-lo d3 between the inside diameters of the pipes' ends.

Furthermore, a "gap" may exist between the end faces of the sections of pipe prior to welding. The "gap" may be defined as the distance between two pipe end faces in a direction approximately parallel to the axes of the sections of pipe. The gap may vary around the joint to be welded in both the radial distance from the pipes' axes and around the circumference of the pipes' end faces. It will be appreciated that a gap of zero will indicate that the sections of pipe are touching at that point. By way of example, FIG. 1c shows a gap d4 between the outer edge of the bevel nose 12a of the section of pipe 10a and an opposing position on the end face of section of pipe 10b. FIG. 1d shows an alternative bevel geometry having a bevelled edge 18 on the internal surface of the pipe. FIG. 1e shows a further alternative bevel geometry having a bevelled edge 18 on the internal surface of the pipe and a wider angle groove geometry on the external surface.

Pipes may be joined with a welding process that lays down filler material (welding wire) in the circumferential groove (see joint 14 to be welded in FIGS. 1a to 1e), which is formed between two ends of pipe to be welded together. Successive layers of filler material may be laid down over the course of several weld passes. It is particularly important to form a high-quality root weld (the first weld pass), but the root weld is difficult to form with the required quality. By way of example, the first welding pass is the one on which the chemical attack of the hydrocarbons will take place; the first welding pass occurs as part of a high productivity process with high intensity current and high thermal input, which can break through the base 16 which supports the weld pool; manufacturing tolerances and the number of different possible ways in which the pipe ends can be aligned make it inevitable that some aspects of the alignment will be better than others; and the welding arc is particularly unstable during the first weld (root weld) pass. If the pipes are not aligned properly during the root weld pass, welding defects can occur as a result of a lack of fusion or a lack of penetration. The absence of such defects is particularly critical when laying "SCR"s (Steel Catenary Risers), due to crack propagation through fatigue, and also in sour gas (clad pipe) applications due to galvanic corrosion effects.

When two sections of pipe are arranged in an end-to-end configuration prior to welding, a gap may exist for a number of reasons. For example, the two sections of pipe may not be arranged close enough to each other, the axes of the two sections of pipe may not be exactly aligned, the end face of a section of pipe may not be flat, the end face of a section of pipe may not be exactly perpendicular to the pipe's axis, or a contaminant may be present between the end faces of the sections of pipe preventing them from coming together. The quality of the weld may also be affected by any gap at the point of welding, particularly if the welding process is performed on the basis that the pipe end faces are uniformly in contact with each other.

Depending on the shape of the respective pipe ends being brought together for welding there may be certain relative orientations, where the gap and hi-lo are within tolerance at certain spaced apart sectors around the circumference but there are at least some points on the pipe ends where the gap and hi-lo are out of tolerance; yet, there may be other (possibly multiple and distinct) relative orientations, where the gap and hi-lo are within tolerance at all relevant locations around the circumference of the pipe ends. In some cases, there may be no available relative orientations, where the gap and hi-lo are within tolerance at all relevant locations around the circumference of the pipe ends; in which cases, the new section of pipe to be welded on the end of the pipeline may need to be rejected, or the previously welded section of pipe removed. Speed and efficiency of pipe laying operations may be improved by quickly ascertaining whether (and if so how) a section of pipe can be aligned, within tolerance, to the end of the pipeline in a position ready for welding, in advance of being moved to such a position.

The use of internal and/or external clamps to hold the pipe and pipeline in aligned position before welding can exert large forces on the pipes. Such forces can be large enough to expand to the internal shape of the pipe. Accounting for and/or controlling such changes in shape whether intentional or otherwise can be challenging when in the field (where conditions are often hostile).

It has been proposed to deform the pipes immediately before welding in order to better align the pipe ends, or to ensure that the pipe ends can be aligned within tolerance. Deforming the pipes for this purpose would require very high forces to be applied to the pipes in a highly controlled manner. Deforming very thick walled pipes to attain a target shape accurately would be difficult.

Certain prior art methods of aligning pipes typically involve calculating or measuring the hi-lo value. Some also involve automatically aligning the pipes. Examples of such prior art methods are described below by way of example.

International Patent Application Publication Number WO2006/112689 discloses an apparatus and method for positioning ends of sections of pipe relative to each other in a J-lay method. In one embodiment the sections of pipe are arranged in an end-to-end configuration by pipe manipulators arranged to the exterior of the pipes. The pipes are held so their ends are slightly spaced apart. The hi-lo is measured whilst the pipes are so held apart. Once the measurements have taken place, the pipes are moved relative to each other to attain a target alignment; during which pipe ends are brought into contact with each other ready for welding. A disadvantage of WO2006/112689 is that welding is performed after the pipes are moved from the position in which their alignment is measured. The alignment during welding may then be subject to error, for example because of uncertainty in the movement of the actuators that manipulate the sections of pipe, or because of conditions differing/changing as between the time and positions of the pipes when being measured when spaced apart and the time and positions of the pipes when having been moved and, supposedly aligned, ready for welding. The relevance and usefulness of the alignment measurement may therefore be compromised. As a result alignment problems may potentially be revealed after welding, possibly leading to rejection and/or re-welding of the joint International Patent Application Publication Number WO2009/148304 discloses a system for joining two sections of pipe. The vertical sections of pipe are arranged in an end-to-end configuration with their ends spaced apart. A measuring device, inserted between the two sections of pipe, measures geometrical data from the pipes' bevels. The geometrical data is processed and provides a target for the relative positioning of the two pipes for welding. The actuators subsequently move the pipes to the target position. The above method requires that the alignment be checked after the actuators have positioned the sections of pipe. The method requires measurement systems to be employed at a point immediately before welding, and requires the shape of the pipes to be scanned in series in the order they are welded; effectively while they are within the pipe-laying tower (using the J-lay method).

International Patent Application Publication Number WO2010/046390 discloses an Internal Line Up Clamp (ILUC) which includes a hi-lo measurement system, which ascertains the internal misalignment (Hi-Lo) of the pipes in a clamped state, in exactly the same position as they will be when performing the welding. The method is suitable for use when laying pipes in an S-lay configuration. Initial alignment is however performed manually, by visual inspection.

International Patent Application Publication Number WO2008/030079 describes a method of J-laying a pipeline. A line-up measuring unit comprising one or more cameras, or a laser sensor for example, determines the position of an upper end of the pipeline, thus facilitating correct alignment of the section pipe to be welded to the pipeline.

WO2016/026969 includes disclosure of a best fit line-up method for use in a J-lay process. Thus, WO2016/026969 proposes digitally scanning the shape of the ends of the pipes to be welded together, and then ascertaining a target position and angular orientation for the two sections of pipe relative to each other to gain a best fit and within the required tolerances for welding. This step also seeks to ensure that seamed pipes are not oriented with their seams unallowably close together. If no target orientation can be found that meets the required tolerances for welding, then the new section of pipe to be welded to the pipeline is rejected (i.e. the bevel geometry of the new section of pipe is deemed to be mismatched with the bevel geometry of the end of the pipeline).

In many of the above methods, the pipe aligning equipment is used in a J-lay process. Thus, the pipeline (string) is held by a holding clamp that maintains the pipeline fixed relative to the vessel. In this case the new section of pipe can be moved by line-up clamps with several degrees of freedom. In particular those clamps can move the section of pipe vertically, translate the pipe on the horizontal plane and can rotate the pipe about its vertical axis. It is not necessarily straightforward to translate such pipe-handling techniques to equipment used for S-lay operations. In S-lay, tracking tensioning machines (tensioners) hold and move the pipe through them. In general during the welding phase the pipeline (string) is fixed with respect to the workstations; the advancing movement of the vessel causes the pipe-laying. In certain circumstances as bad weather conditions, the vessel can experience large oscillatory motions, requiring the tensioner to let the string move along the vessel to avoid excessive stress to the pipe. When S-laying pipe-line, welded pipe joints often need to be cut out and repeated, because of poor quality welding resulting from poor alignment owing to inaccuracies of the line-up machines, human factors, or other factors not being compensable with the current technologies. There is a need for increased accuracy and repeatability of the pipe coupling (alignment) and welding phase, whilst maintaining and/or improving speed of pipe-laying, particularly in the context of the S-lay method.

The present invention seeks to mitigate one or more of the above-mentioned problems/disadvantages. Alternatively or additionally, the present invention seeks to provide an improved method of aligning pipes end-to-end when welding together such pipes. Alternatively or additionally, the present invention seeks to provide an improved method of aligning a pipe and a pipeline, particularly when S-laying pipeline.

SUMMARY OF THE INVENTION

The present invention provides, according to a first aspect, a method of aligning pipes end-to-end in a position ready for welding. The pipes may comprise a first pipe and a second pipe. The pipes may be for forming a pipeline for carrying fluid hydrocarbons, for example an oil and/or gas pipeline.

The method may be performed as part of a method of laying offshore pipeline. For example, the method may be performed as part of a method of laying a sub-sea pipeline from a vessel. The method may be performed as part of a method of laying onshore pipeline. One of the pipes (e.g. the first pipe) may be the end of a pipeline, for example a subsea pipeline; and the other of the pipes (e.g. the second pipe) may be a new section of pipe for welding to the end of the pipeline. The method includes a step of moving the pipes towards each other, for example by moving a pipe towards a free end of a pipeline. The ends of the pipes are bevelled (i.e. shaped with a profile so that when the pipe ends are aligned a joint for welding is formed). A scan of the shape of the bevelled end of the pipe, preferably of both ends of the pipes that are being moved together, is held in the memory of a control unit. The first pipe, and preferably also the second pipe, has a plurality of machine readable codes located at positions distributed around the circumference of the pipe, for example at or near the end of the pipe. The method includes a step of reading at least one of the codes, for example with a reader (in the form of a machine or part thereof for reading such codes). The control unit ascertains the relative movement between the first pipe and the second pipe required to align them in accordance with a target orientation. (It may be that the control unit ascertains the relative movement so required before conducting the step of moving the pipes towards each other.) The control unit preferably ascertains such relative movement with the use of information provided by the at least one codes read by the reader (including for example the circumferential location around the pipe of the code(s) so read) and the shapes of the bevelled ends of the pipes stored in the memory of the control unit. Thus, by using a reader to identify a code on a pipe, the circumferential region of the pipe in the field of view of the reader can be identified. This in turn, for example with the use of the scanned shape of the bevelled end of the pipe, can enable the exact position/orientation of the bevelled end of the pipe to be ascertained in 3-D space, without needing to re-scan the whole pipe end. Embodiments of the present invention are thus able to provide fast and reliable means of aligning pipe ends when welding together pipe as part of the process of laying a pipeline from a vessel.

The machine readable codes are preferably located on the exterior surface of the pipe, preferably at or near the end of the pipe. For example, it may be that the machine readable codes are located on or in the region of a bevelled end of the pipe, for example on the bevel wall and/or on the bevel shoulder. The machine readable codes are preferably located both on the first pipe and the second pipe (one of which optionally being the end of a pipeline). Each machine readable code may be associated with a particular circumferential position on the pipe, so the particular machine readable code read at a particular location may be used to ascertain the rotational orientation of the pipe about its axis.

The shapes of the bevelled ends of the pipe/pipeline stored in memory may include data relating to the dimensions (measured distances) of the bevelled ends. The shapes may be represented by a multiplicity of data points, each data point representing a point on the surface of the end of a pipe. Each data point may include details of the position of the point in 3-D space. The surface and geometry of the pipe end can be reconstructed/modelled by means of interpolating between the data points. The collection of data points may be in the form of a point cloud. There may be 40 or more measurements taken to adequately characterise the shape of a bevelled pipe end. More than 100 measurements may be taken.

The control unit may be arranged to output instructions which are used to move the pipes (e.g. the pipe relative to the pipeline) in accordance with the relative movement ascertained by the control unit. The instructions may comprise a series of separate instructions that are issued over time in order to effect the relative movement required to attain the target orientation. The control unit may be arranged to output instructions which are used automatically to move the pipes in accordance with the relative movement ascertained. Information may be provided to a manual operator concerning the relative movement ascertained by the control unit. A manual operator may assist—or be assisted—in effecting the relative movement ascertained by the control unit.

The control unit may calculate a target orientation of the sections of pipe for welding, for example in dependence on the geometry of the pipes' bevelled ends as previously scanned. The target orientation may include specifying the position of the pipes relative to each other in 3-D space, so that the distance between any known point on one pipe and any known point on the other pipe is able to be calculated unambiguously. The target orientation may be calculated in view of criteria concerning the geometry of the pipe joint to be welded. For example, the target orientation may be calculated to provide a desirable distribution of hi-lo value(s) and/or gap value(s) across the joint to be welded. It may be possible to optimise the alignment of pipes in this way, so as to not only ensure that the hi-lo/gap criteria are met but that the best alignment possible is set as the target. For example, the best alignment possible may be defined as the one that produces the minimum internal hi-lo value around the circumference of the pipes. Other criteria may be applied when ascertaining the best-fit and/or an acceptable target alignment. For example, the target orientation may be one that attains the minimum hi-lo whilst also ensuring that the orientation has an acceptable "gap" (i.e. no greater than a pre-set threshold). The target orientation may be one that seeks to minimise a weighted combination of both hi-lo and gap such that it might be the case that a different orientation has a lower hi-lo (but a higher gap) and/or a lower gap (but a higher hi-lo). The target orientation may be one that attains the minimum gap whilst also ensuring that the orientation has an acceptable hi-lo (i.e. no greater than a pre-set threshold at any given circumferential position). Embodiments of the present invention are thus able to provide a means of aligning pipe ends when welding together pipes with increased weld quality. The target orientation may be one that minimises the pipe movements required, whilst attaining an acceptable gap and an acceptable hi-lo. The target orientation may also take into account conditions relating to the relative alignment of the respective longitudinal seams of the pipes (e.g. must be separated by more than a minimum threshold angle or by more than a minimum distance along the circumference).

When the geometry of the pipes' ends (e.g. bevels) are adequately characterised and known in advance, it is not necessary, at the same time as (or at the same location as) the pipe aligning/welding procedure, to scan the entire pipe end again. All that is required for a given pipe, in certain embodiments of the invention, is to detect the position of three points in space on the pipe end; all other geometrical and positional information concerning the bevelled end of the pipe can then be extracted from the scanned (digitised) shape held in memory. (It may be that in certain embodiments of the invention, it is sufficient to detect the position of only two points in space on the pipe end in order to be able to extract the required information concerning the bevelled end of the pipe from memory—for example in the case where the detected points are to be a subset of the point previously acquired during the 3-D scanning of the bevelled surfaces.) It may be that whilst it is not necessary, at the same time as (or at the same location as) the pipe aligning/welding procedure, to scan the entire pipe end again, there may be a step of scanning a portion (a small portion for example—e.g. less than 20% of the surface area previously scanned) of the bevelled end of a pipe to assist with detecting the position and orientation of a pipe. It may be that the knowledge of the detected position (e.g. the circumferential position only) of one code on a pipe in conjunction with the knowledge of the detected position and shape of only one portion of the bevelled end of a pipe is sufficient to fully define the position and orientation of the pipe, for example if the detected position and shape of the portion itself fully defines the position and orientation of that portion. In such a case, the knowledge of the circumferential position of the detected portion can guarantee that the portion is not being mistaken for a different portion of the pipe. In some cases, it may be difficult to accurately measure the distance from a scanner of the portion of the bevel being scanned but otherwise possible to ascertain accurately the shape of the bevel being scanned. In such a case more than one portion of the end of the pipe may need to be measured/scanned and/or the position of more than one code may be needed. It may for example be the case that the detected position of one code on the pipe in conjunction with the detected position and shape of only two (optionally, only three) spaced-apart portions of the bevelled ends of the pipe is sufficient to fully define the position and orientation of the pipe. Once the position and orientation of the pipe in space is known, all other geometrical and positional information concerning the bevelled end of the pipe can then be extracted from the scanned (digitised) shape held in memory. A distance detector may be used to measure the position of a portion of the pipe, or at least the distance from a fixed point in space of a point/feature on the pipe. The distance or position so measured may be used to determine (or check) the position/orientation of the pipe in 3-D space. Two only or three only (or possibly more) measurements by one or more such distance detectors—or other sensor units that are arranged to detect the position of a particular feature (e.g. point) on the bevelled end of a pipe—may be used to determine (or check) the position/orientation of the pipe in 3-D space.

If the relative positions in 3-D space of both the first pipe and the second pipe (e.g. a new section of pipe and the end of a pipeline), when fully aligned, is known and the bevelled end of each of the first pipe and the second pipe has been scanned and stored in memory, then the geometry and shape of the entire joint to be welded can be calculated and modelled; and geometric parameters/data can be extracted as required from the joint to be welded as so modelled. It may for example be possible to extract a value of the minimum internal hi-lo value around the circumference of the pipes, with the knowledge of the location of three points on each of the first pipe and the second pipe. The method may include a step of using the data concerning the shape of the bevelled ends to calculate the hi-lo, or optionally hi-lo and gap, at one or more points corresponding to locations on the pipe which are remote (spaced apart) from the circumferential positions of the codes that are read with the reader. Reducing the number of locations on the end of the pipe that need to be viewed and/or measured directly during the step of aligning pipes in an end-to-end configuration may enable faster alignment of the pipes and improved production rates. It may be that knowledge of the position of a certain number (two or three for example) of points on the pipe is sufficient for enabling the calculation of the geometry and shape of the joint to be welded, but that the position(s) of one or more extra points are additionally detected, for example to provide for redundancy. In certain embodiments it may be the case that the positions of the small number (e.g. 2, or 3, or 4, say) of points, which need to be detected in order to extract the bevel shape/geometry information from memory, need to be within the surface(s) scanned by a scanner.

The control unit may determine whether or not the pipe end geometry of the first pipe (e.g. a new section of pipe) is sufficiently closely matched to the pipe end geometry of the end of the second pipe (e.g. at the end of a pipeline) to be suitable for welding the two together. The control unit may provide an output, which may for example alert the operator, in the event that two sections of pipe are incompatible—cannot be fitted together in a manner that meets certain pre-set quality criteria for example. The control unit may provide such an output, in the event that two sections of pipe are incompatible, for example before a new section of pipe is moved to the region of the end of a pipeline. This measure may save time by reducing the number of rejected welds and/or reducing the time lost by handling incompatible sections of pipe.

Pipe handling equipment will typically be provided for effecting the relative movement required. Such movement may include rotation about the pipes axis. One or more pipe rollers may be provided for this purpose. Such movement may include rotation about different axes, for example transverse to the longitudinal axis of the pipe. Such movement may include translation about two or possibly three orthogonal axes. The control unit may be configured to control such pipe handling equipment. The control unit may output instructions to the pipe handling equipment which effect the relative movement to attain the target orientation. The pipe handling equipment preferably has the ability to manoeuvre the sections of pipe relative to each other with sufficient degrees of freedom to attain all relative positions of the pipe ends relative to each other as might reasonably be required in the field to achieve an acceptable alignment. Rotation of a section of pipe about an axis transverse to its longitudinal axis may be achieved by moving one end of the pipe while holding or moving the other end, to effect such a rotation. For example, rotation of a section of pipe about an axis transverse to its longitudinal axis may be achieved by clamping the section of pipe with two sets of clamps at different positions along the length of the pipe, then changing the position of one set of clamps relative to the other set of clamps. Other means could be used to hold and/or move the pipe including for example a pipe saddle, rollers, tracked supports, and the like.

The pipe handling equipment may comprise one or more movable clamps. The pipe handling equipment may comprise one or more controllable actuators. The pipe handling equipment may comprise one or more rollers. The pipe handling equipment may comprise one or more movable saddles for supporting the pipe. The pipe handling equipment may comprise one or more movable tracks for holding and/or supporting a pipe, the tracks for example being part of a tracked roller.

The plurality of machine readable codes preferably comprises at least ten unique codes. There may be a sufficient number of codes that for any given sector of the circumference spanning at least 40 degrees (preferably 10 degrees, and optionally 5 degrees) around the circumference there is at least one code unique to that sector. The codes are conveniently regularly spaced around the circumference of the pipe. There may be at least ten unique codes such that for any given sector of the circumference spanning 36 degrees around the circumference there is at least one code.

The reader mentioned above may comprise one or more sensor units, each unit being arranged to read a different code. It may be that the machine readable codes are read by means of a camera. The reader mentioned above may comprise one or more such cameras. The or each camera (or sensor unit) may be arranged such that its field of view is fixed during the step of reading at least one of the codes. The position of the field of view of a camera may be known in advance so that the particular code read by the camera provides information about the circumferential position of the pipe. For example, if a camera (or other sensor unit) is positioned to read the uppermost code (at or near to 0 degrees position) of a pipe when the pipe's axis is horizontal, and the camera reads a code corresponding to the +30 degrees position on the pipe (with the longitudinal seam representing the zero degrees position on the pipe for example), it may be assumed that the zero degrees position on the pipe—i.e. the location of the longitudinal seam—is at the −30 degrees position (i.e. at the 270 degrees position). The reader, for example comprising one or more cameras, may be arranged to output data to the control unit representing the identity of the code(s) viewed by the reader. Such data may also include information concerning the position in a 3-D coordinate system of the code(s) so viewed. Information concerning the position in a 3-D coordinate system of the code(s) so viewed, may alternatively or additionally, be inferred. One or more, possibly all of, the machine readable codes may be in the form of one or more bar codes. One or more of, possibly all of, the machine readable codes may be in the form of one or more Quick Response (QR) codes. The machine readable codes may represent an alphanumeric string, for example a number. The machine readable codes may be represented by binary code. The codes may be arranged around the pipe such that for the majority, and preferably all of the codes, adjacent pairs of codes around the circumference of the pipe differ by one bit only. For example, the codes may be in the form of a set of "Gray" codes.

It may be that each code has a discernible centre in the circumferential direction. The position of the code may for example be referenced to the circumferential position of the centre of the code. The position of the code may be referenced to the circumferential position of a different reference point of the code on the pipe. Each code may be spaced apart from an adjacent code, possibly by at least 0.5 mm. Each code may be less than 5 mm$^2$ in area. Each code may extend less than 20 mm, and preferably less than 10 mm (optionally less than 2 mm), in the circumferential direction around the pipe. In certain embodiments, the codes need not be spaced apart from each other such that the pipe effectively has a continuous ring of codes around its circumference. Such an arrangement may be beneficial in that it enables a reader to read a code irrespective of the circumferential position between reader and pipe. It may be that the reader is arranged to view only part of a code-marking. In the case of a bar-code, the reader may discern the code without needing to view the start or end of the code in the circumferential direction around the pipe. In certain embodiments, it may therefore be the case that the circumferential location of a code, as read by the reader, around the pipe, is known to within a particular tolerance that may be greater than 0.5 degrees, for example. In other embodiments greater accuracy may be achievable, such that the circumferential location of the code on the pipe may be detected with an accuracy of better than +/−1 mm.

The codes may be in the form of a 6-bit code, and preferably at least 8-bit. There may be more than 50 and preferably more than 100 unique machine readable codes on the end of the pipe. The machine readable codes may be coded in a format that permits at least 60 unique codes. The machine readable code(s) read by the reader may be used, directly or indirectly, to ascertain the information concerning the shape of the bevelled end of the pipe at the circumferential location of such code(s) on the pipe. One or more (and possibly all) of the machine readable code(s) read by the reader may be used, directly or indirectly, to ascertain information concerning the identity of the pipe (for example to distinguish from a small number of other pipes)—preferably additionally to the information concerning the shape of the bevelled end. The part of the code concerning the identity of the pipe may enable one pipe to be distinguished from any one of a group of similarly marked pipes, wherein there are four or more such pipes in the group, possibly more than 20 and optionally more than 100 pipes in the group. It may be that the identity of the pipe is not included in the information represented by each and every machine readable code on the pipe. It may be that the number of codes including information representing the identity of the pipe is fewer than half (possibly fewer than 10% and/or fewer than ten) of the total number of the machine readable codes. It may be that a pipe end includes a single code, for example a bar-code or QR-code (e.g. marked on the surface of the pipe that is inside the pipe), representing the identity of the pipe. Such a single code may be provided also to represent the 0 degrees position on the circumference of the pipe.

The reader may form a part of a coupling station at which steps are performed of coupling, and then welding, the pipe to the end of another pipe, for example the end of a pipeline. The reader may also comprise a proximity sensor. The reader may also comprise a laser scanner, for example a profilometer or other laser scanning device. The laser scanner may have a laser for emitting laser light toward the end of a pipe and a light sensor for receiving reflected laser light. The laser may be arranged so that in use a laser beam emitted by the laser illuminates a particular point on the end of a section of pipe. The light sensor may be arranged so that in use the light sensor receives laser light reflected from the surface of the pipe, enabling the location in 3-D space of the point to be ascertained. The light sensor may be a charge-coupled device (CCD) based camera adapted for this application. The light sensor may additionally be configured to be able to read the machine readable codes. The laser beam may be pulsed such that it illuminates a series of points on the surface of the pipe. The method may include using at least one reader to ascertain the shape and/or relative position of the bevelled end of the first pipe and/or the second pipe. The method may include using at least one reader to ascertain the position of a point (or a particular feature) on the bevelled end of the first pipe and/or the second pipe. The method may include using at least one reader to ascertain the position of two, three or possibly more points (or features) on the bevelled end of a pipe and use that information, possibly with other information, to determine the position/orientation of the pipe in 3-D space. The method may include a step of ascertaining the shape of the bevelled end of the first pipe and/or of the second pipe during the alignment process (when the ends are adjacent, or close to adjacent to each other, for example). The reader may be used to determine the absolute or relative position of the end of the pipe during the alignment process.

The method may comprise a step of the control unit ascertaining information concerning the shape of the bevelled end of the pipe at the circumferential location of a machine readable code on the pipe that has been read. The method may comprise a step of the control unit using a machine readable code to extract, or otherwise ascertain, information concerning the shape of the bevelled end of the pipe at the circumferential location of the code on the pipe. The method may comprise a step of the control unit ascertaining information concerning the shape, and position in 3-D space, of the bevelled end of the pipe at a circumferential location on the pipe spaced apart from any of the code(s) read, using the location of the code(s) that are read. The control unit may use a machine readable code as a key with which data concerning the shape of the bevelled end of the pipe is extracted. The information provided a given code may relate directly to an aspect of the geometry/shape of the pipe at the circumferential position of the code. For example, 360 unique codes representing the numbers 0 to 359 could be provided around the circumference of the pipe each such code representing in degrees the circumferential position of the code around the pipe. As alluded to above, the codes may (preferably additionally) represent information concerning the identity of the pipe. It may be that in some embodiments, each code represents at most these two pieces of information. For example, the information represented by each code may consist only of information relating the circumferential position of the code and the identity of the pipe. The method may comprise a step of the control unit ascertaining information concerning the identity of the pipe from the machine readable code on the pipe that has been read. The step, if so performed, of the control unit using a code to extract/ascertain information concerning the shape of the bevelled end may include using such information concerning the identity of the pipe.

The step of the control unit ascertaining the relative movement required to attain the target orientation may require at least two, possibly at least three codes to be read. It may be that ten or fewer codes need to be read in order to perform the step. The positions of three codes may be sufficient for example to ascertain the orientation of a pipe in 3-D space. Not all of the machine readable codes on the pipe need to be read for the purposes of aligning the first pipe and the second pipe in accordance with the target orientation. Fewer than half may be read for example. It may be that fewer than ten are read. In some embodiments of the invention, only one code may need to be read per pipe end, with other codes being ready for the purposes of providing redundancy.

There may be multiple readers. One reader may be associated with one pipe end and a separate reader may be associated with another pipe end. Multiple codes may be read, substantially contemporaneously, for example with the use of the multiple readers. Multiple codes on a single pipe may be read, substantially contemporaneously. During the reading of multiple codes on a single pipe, it is preferred that there is no need for the reader, or a part thereof, to revolve or otherwise move from one location on the circumference on the pipe to another location on the circumference on the pipe. It may be that the reader is arranged to view certain parts of the pipe exterior simultaneously with certain other parts of the pipe exterior, without viewing intervening regions of the pipe exterior. The reader may be static, relative to the vessel and/or relative to one of the pipe ends during the step of reading the codes. Whilst operations may be conducted substantially contemporaneously in the context of the time taken to read the codes, it will be appreciated that the operations, or parts thereof, may be conducted one after the other (for example, with the time between the start of two successive code-reading operations being of the order of a few milliseconds).

The method may include scanning the shape of at least a part (and preferably only a part) of the previously scanned bevelled end of a pipe as it is moved into alignment, for example as part of a closed loop system for aligning the pipe in accordance with a target orientation. The method may include detecting the position and/or orientation of the end of the pipe as it is moved into alignment. There may be a step of detecting the position and orientation of the adjacent ends of the first pipe and the second pipe. This may be performed with the use of two scanning devices, one viewing the end of the first pipe and the other viewing the end of the second pipe. A step of detecting the position and orientation of the adjacent ends of the first and second pipes may be conducted multiple times during the movement towards the target orientation. Such a step may be performed by one or more of the readers mentioned above.

The method may include using at least one scanner to ascertain the shape and/or relative position of the bevelled end of a pipe (for example the first and/or second pipe) and/or the bevelled end of a pipeline. For example, the method may include a step of scanning and then storing in electronic memory, the shape of a bevelled end of the first pipe and/or of the second pipe. There may for example be a step of storing data defining an electronic representation of the shape in a memory storage device, for example the memory of the control unit. The shape stored in memory may thus take the form of a digitised version of the shape, for example being in the form of a point cloud. Such a scanning step may be conducted before the alignment of the pipes is started (for example, before the pipe ends are moved close enough to each other to be considered adjacent, such as before the introduction of the new section of pipe into the firing line). The scanning step may be conducted immediately after the bevelling of the pipes. The scanner may comprise one or more laser scanning devices. The laser scanning device may be in the form of a laser profilometer. The laser scanning device may have a laser for emitting a laser beam to illuminate a series of successive points on the pipe surface. The scanner may form a part of an analysis station. The analysis station may be located at a position spaced apart from where pipe is welded to the end of a pipeline. The analysis station may be separated from the firing line. The analysis station may be located at the same location as a pipe-bevelling station, for example the analysis station may form part of the bevelling station.

The scanner may comprise one or more rotating arms. Each arm may carry, for example at the end of the arm, a scanning device (for example comprising a camera, laser profilometer or the like) arranged to scan a section of the bevelled end of the pipe. The scanner may be so configured to cause the scanning device to rotate around the pipe so that the scanning device scans further sections of the bevelled end. The arm may rotate about a central hub. The hub may be movable to and from a position located on the axis of the pipe. The scanning devices may each be provided on rigid structure. The rigid structure may accommodate two or more of the scanning devices of the scanner. Thus, the position of one scanning device may be fixed relative to another scanning device. The rigid structure may define two or more of the aforementioned arms that carry respective scanning devices. The scanner may be configured such that in use, there are scanning devices mounted at different spaced-apart locations around the circumference of the pipe, the distance between such locations being fixed. Such an arrangement allows the scanning devices to share a common coordinate system.

In the case where the scanner has arms, the length of the arms (or at least the distance from the end of the arm adjacent to the pipe circumference to the centre of the pipe) may be adjustable so that the same scanner can be used with pipes of different diameter.

There may be a step of ascertaining the circumferential position of a longitudinal seam on the pipe. Such a step may be performed with the use of one or more cameras that detect the seam or detect a marking on the pipe aligned with the seam. Such a step may be performed at the same location as the scanning of the shape of the end of the pipe, for example at an analysis station. Such a step may be performed with the use of X-ray radiation. It is preferred in certain pipe-laying operations for successive sections of pipe to be welded such that their seams are rotationally off-set relative to each other.

There may be a step of a pipe-marking machine applying the plurality of machine readable codes on the pipe. That step may be conducted at the same time as the scanner is used to scan the shape of a bevelled end of a pipe (for subsequent storage in the memory of the control unit). The multiple codes may be applied by means of a printing process, for example a laser printing process that applies marks directly onto the exterior of the pipe surface. Codes may be printed onto separate material than is then fixed to the pipe. For example, the multiple codes may be applied by means of fixing to the pipe a mark carrier, for example a label, a collar, a band, a removable support or the like. The mark carrier may bear all of the multiple codes for an end of a pipe, so that marks do not need to be printed in situ. The step of the pipe-marking machine applying codes on the pipe may be performed after, for example immediately after, a step of bevelling the end of the pipe being marked. The multiple codes may be applied onto the newly bevelled surface. Having the marks on the newly bevelled surface may improve the contrast between the marks applied to the pipe and the immediately surrounding pipe surface.

The step of ascertaining the relative movement required to align the pipes in accordance with a target orientation may utilise a pipe handling strategy. The pipe handling strategy may be electronically recorded and may be adaptable. The pipe handling strategy may be stored on a computer program product, such as RAM, ROM, or other electronic storage media. The pipe handling strategy may allow the control unit to calculate an efficient way of moving the pipe to attain the target orientation. The pipe handling strategy may allow the control unit to convert between a calculated movement required to move the pipe towards the target orientation and a control parameter for instructing pipe handling equipment or a part thereof. The pipe handling strategy may include one or more algorithms. The pipe handling strategy may require additional inputs such as information concerning the type of pipe being moved. For example, the material of the pipe and/or the length, diameter and/or mass of the pipe may be used as inputs into the pipe handling strategy.

After a relative movement between the pipe and the pipeline has been effected under the control of the control unit (for example, relative movement part or fully towards the target orientation) there may be a step of measuring the actual position of the pipe and pipeline. Alternatively or additionally, there may be, after the relative movement calculated to reach the target orientation has been effected under the control of the control unit, a step of taking a measure of the quality of the alignment of the bevelled ends. Data concerning the quality of the alignment may be sent to the control unit. The quality of the alignment may for example be a comparison of measured relative positions of the first pipe and the second pipe with the expected (target) position. The quality of the alignment may take into account, or be based on, the values of the hi-lo and/or gap parameters of the joint (before and/or after welding). The quality of the alignment may for example be a comparison of measured hi-lo and/or gap parameters of the joint (before and/or after welding) with expected values. The quality of the alignment may for example be a comparison of measured hi-lo and/or gap parameters of the joint (before and/or after welding) with other values, such as for example threshold values and/or average values for other pipe joints formed with the method. There may be a step of the control unit receiving data concerning the quality of the alignment. The control unit may be configured to ascertain what changes, if any, could be made to improve the instructions issued by the control unit to effect the relative movement required to attain the target orientation. In the case where there is a pipe-handling strategy, which is used in the step of moving the pipe(s) in accordance with a target orientation, the control unit may be configured to ascertain what changes, if any, could be made to improve the pipe-handling strategy, for example to improve the quality of the alignment as measured. The pipe-handling strategy may then be modified and/or updated accordingly. With time, the pipe-handling strategy may thus be improved and/or optimised, thus enabling accurate and reliable alignment of the pipes. The chances of producing an unsuitable joint may thus be reduced. By gaining knowledge of (e.g. predictable) mis-alignments (or errors in movements), and knowledge of the post-alignment (or post-movement) corrections that are required to correct for any errors, the control unit may be able, effectively by machine-learning for example, to compensate for such mis-alignments (or errors in movements) in advance.

In an embodiment of the invention, after steps have been conducted to move the first pipe and the second pipe into alignment, the following steps may be carried out: ascertaining a hi-lo parameter (such as the average hi-lo, the maximum hi-lo around the circumference, possibly taking into account the internal hi-lo and/or the external hi-lo) to provide an objective measure of the accuracy of the alignment of the bevelled ends, the control unit ascertaining what changes, if any, could be made to the instructions issued by the control unit when performing the alignment to achieve an improved value for the hi-lo parameter (e.g. lowering the values(s) of the hi-lo parameter(s) measured/calculated) and thus enable future improvement of the accuracy of the alignment performed by the control unit. Accurate alignment of the pipes once welded and the confidence of the accuracy of alignment may thus be improved. The chances of producing an unsuitable joint may thus be reduced. Knowledge and correction of any mis-alignment, for example as determined by a hi-lo measurement, may thus result in higher quality welds and fewer instances of weld rejection.

As a result of deformation of the shape of the pipes as a result of the forces and loads sustained during the pipe laying process, there may be significant differences between the shape of the ends of the pipe when measured and the shape of the ends of the pipe after welding has been completed and/or after the weld joint so formed has been lowered into the water. Such differences may also be accommodated for by means of adapting the pipe handling strategy. It may be necessary effectively to adapt the shape(s) of the bevelled end(s) of the pipe(s) as initially scanned and/or as stored in the memory of the control unit to take account of the changes in shape that might be caused by such forces and loads. Such a step may be performed in part by a machine-learning process.

The step of moving the pipes towards each other (for example by moving a pipe towards the free end of the pipeline) may be conducted by the control unit using a closed loop control method. Such a closed loop control method may comprise a step of detecting the relative positions of the bevelled ends of the pipes (e.g. of the end of the pipe and of the adjacent free end of the pipeline) as the ends are moved together (for example, by moving a pipe towards the free end of the pipeline). Such a closed loop control method may comprise a step of the control unit ascertaining the relative movement between the first and second pipes required to bring them into closer alignment in view of a target orientation. The step of the control unit ascertaining the relative movement so required may use information concerning the relative positions of the bevelled ends as detected. The step of the control unit ascertaining the relative movement so required may use information concerning the shapes of the bevelled ends of the first pipe and the second pipe stored in the memory of the control unit. The closed loop control method may comprise a step of the control unit causing at least some of the relative movement between the first pipe and the second pipe as calculated, and then repeating the steps of the closed loop control method, at least twice again, and preferably multiple times (e.g. five or more times). The step of ascertaining the relative movement between the pipes required to align them, with the use of the shapes of the bevelled ends stored in the memory of the control unit, may be performed before the closed loop method is conducted, and possibly not during the closed loop method. Alternatively, or additionally, there may be multiple steps of ascertaining of the relative movement between the pipes using the shapes of the bevelled ends stored in the memory of the control unit, during the performance of the closed loop method.

The method may include a step of welding together the two sections of pipe, e.g. welding a pipe to the end of a pipeline. The welding step is preferably performed immediately after the pipes have been correctly moved to their target orientation. It is preferred however that a verification step is performed to verify that the pipes are indeed correctly aligned before the welding step is commenced. A step of calculating the hi-lo may be conducted, before the welding step is commenced, for example hi-lo parameters may be measured and/or calculated once the pipes are aligned—for example immediately before a line-up clamp clamps the pipes in position and/or after such a line-up clamp has clamped the pipes in position. The gap may also be measured and/or calculated, for example together with the hi-lo.

By ascertaining the position in 3-D space of three points on each pipe and relating that to the stored data concerning the shape of the pipe ends, the shape of the joint can be computer-generated. Thus, the method may include the step of detecting the position of three machine readable codes on each pipe end either side of the joint, and then with the use of the shapes of the bevelled ends of the first pipe and the second pipe stored in the memory of the control unit calculating a hi-lo value, preferably concerning the internal hi-lo. It may be that an internal hi-lo measure can be ascertained after the pipes have been aligned (and/or after the pipes have been clamped in the position ready for welding) by means of measurements taken only from the exterior of the pipes, on the basis of prior measurements of (i.e. scanning the 3-D shape of) the bevelled pipe ends. This may allow a time- and/or cost-saving as only an external measurement system may be needed to obtain the hi-lo measurements during the time the pipes are in the firing line. Additionally, because the measurement system may be positioned to the exterior of the pipes, the use and provision of such a measurement system can be effected without needing to interfere with an ILUC inside the pipe.

The method may be performed as part of a method of laying a sub-sea pipeline from a vessel, for example an S-lay method. The method may have application as part of a method of laying a sub-sea pipeline using a J-lay method. It will be appreciated that the method of moving a pipe relative to the free end of the pipeline may have application during an S-lay, or other pipe-laying process, wherein two sections of pipe are aligned relative to each other and then welded together (neither section at that time being connected to the pipeline being laid), for example when forming a longer length of pipe for attaching to the end of the pipeline, and/or when welding several lengths of pipe, in the firing line, at substantially the same time to the end of a pipeline. At least one of the pipes will typically be arranged such that its axis is at an angle of less than 30 degrees to the horizontal. At least one of the pipes will typically be arranged such that its axis is horizontal, or at least close to horizontal.

It may be the case that at least part of the pipeline, after it has been installed, remains suspended in the water during its lifetime, such that for example the pipeline is subject to fatigue loading via the action of marine currents. Such a pipeline may be in the form of a subsea catenary riser. The new length of pipe to be welded to the pipeline may comprise two, three or four pipe sections welded together to form what is referred to in the art as a "joint" (i.e. for a 2-J, 3-J, or 4-J pipe). The term "joint" as used herein will however typically be used to refer to the weld joint or such a joint prior to welding, unless the context suggests otherwise.

The method of the present invention may have application in relation to various pipe-laying applications requiring accurate alignment of the sections of pipe being welded together. Some applications (for example high quality operations when laying "SCRs", steel catenary risers) may require the hi-lo to be <0.5 mm. Other less demanding SCR applications may require the hi-lo to be <1 mm. Standard trunk line may permit the hi-lo to be up to 3 mm.

The pipe-sections used in the method will typically be ones suitable for transportation of hydrocarbons, such as gas or oil, and will of course be suitable for use at sea. Such pipes may have a diameter in the range of 3 to 60 inches, and will often be larger than 10 inches in diameter. The sections of pipe may have a diameter in the range of 6 to 40 inches. The present invention has particular application in relation to pipes with a diameter of 200 mm or greater, preferably 500 mm or greater. The pipe wall thickness will typically be greater than 10 mm. The sections of pipe may have pipe wall thickness in the range of 5 mm to 50 mm, for example in the range of 10 mm to 40 mm. The present invention has particular application in relation to pipes having a pipe wall thickness of 20 mm or greater.

The pipes may be carbon steel pipes. The pipes may be clad pipes (i.e. having an internal lining of a different material, such as a corrosion resistant alloy).

There may be a step of bevelling the pipes, which is conducted on the pipe laying vessel.

According to a further aspect of the invention, there is provided a method of preparing a pipe for use in a method of laying a pipeline, wherein the method comprises a step of marking the pipe with a plurality of machine readable codes located at positions distributed around the circumference of the pipe. The method of preparing may comprise a step of scanning the shape of a bevelled end of the pipe. The method of preparing may comprise a step of storing data defining an electronic (e.g. digital) representation of the bevelled end of the pipe in a machine-readable memory unit. The method of preparing may comprise a step of storing, in the machine-readable memory unit, data relating the position of each of the machine readable codes to the shape of the bevelled end as defined by the electronic representation so that at least an aspect of the shape of the bevelled end relative to the position of a machine readable code can be extracted from the machine-readable memory unit with the use of the machine readable code. The method of preparing may comprise a step of associating each code of the plurality of machine readable codes with an aspect of the shape of the bevelled end corresponding to the position of the machine readable code, and as a result organising the data in the machine-readable memory unit so that the aspect of the shape of the bevelled end corresponding to the position of a machine readable code can be extracted with use of the machine readable code. A step of marking the pipe with a machine readable code may be conducted before conducting a step of scanning the shape of the bevelled end of the pipe corresponding to the position of that machine readable code. It may be that the method is performed such that all of the machine readable codes are marked on the pipe before scanning the shape of the bevelled end of the pipe corresponding to the position of any of the machine readable codes. Alternatively, it may be that a step of marking the pipe with a machine readable code is conducted then a step of scanning the shape of the bevelled end of the pipe corresponding to the position of that machine readable code is conducted and the process is then repeated for further positions around the circumference of the pipe. The method may include a step of reading each of the machine readable codes with a reader as described in further detail above. The method of preparing may comprise a step of ascertaining the circumferential position of a longitudinal seam on the pipe, for example in the manner as described above. Such a step may for example be performed at the same time and/or location as the step of scanning of the shape of the end of the pipe. There may be a step of relating the circumferential position of the seam to the position of one or more of the machine readable codes and/or to a part of the shape of the bevelled end of the pipe. For example, there may be a step of positioning a machine readable code corresponding to the zero degrees position at the same circumferential position as the seam. There may be a step of ascertaining the machine readable code that best corresponds to the circumferential position of the seam.

According to a yet further aspect of the invention, there is provided a method of using a control unit to align pipes end-to-end in a position ready for welding with the use of a pipe-handling strategy held in a memory of the control unit, the pipe-handling strategy having been adapted for example to take account of the type of pipe and pipeline and/or the pipe-handling apparatus so used. Such a method may comprise the control unit ascertaining the relative movement between the pipes (e.g. a new section of pipe and an end of a pipeline) required to align them in accordance with a target orientation with the use of the relative positions of the bevelled ends as detected and/or the shapes of the bevelled ends of the pipes stored in the memory of the control unit (e.g. scanned/digitised shapes). There may a step of using pipe-handling apparatus to move the pipes relative to each other, under the control of the control unit. The control unit may for example send instructions to cause the pipe-handling apparatus to effect the relative movement between the pipes so ascertained. There may be a step of detecting the relative positions of the bevelled ends of the pipes. After the pipes have been moved, for example by pipe-handling apparatus, by the relative movement so ascertained, there may be a step of measuring the quality of the alignment of the bevelled ends. Data concerning the quality so measured may be sent to the control unit. There may then be a step (for example performed by the control unit) of ascertaining what changes, if any, could be made to the instructions issued by the control unit to improve the quality of the alignment, and as a result updating the pipe-handling strategy. Thus, the method may employ a machine-learning methodology to improve the quality of the alignment of the pipes for subsequent pipe alignments. The pipe strategy may take account of pipe mass, pipe family and the like. Different objective measures of quality are mentioned above, and may for example include direct or indirect measurements of the hi/lo.

A further aspect of the invention provides a method of aligning pipes end-to-end in a position ready for welding, wherein the method employs a closed loop control process. There may be a control unit arranged to instruct pipe-handling apparatus, for example to move a pipe towards a free end of a pipeline. The pipes (e.g. the pipe and the pipeline) each have a bevelled end with a shape which has been scanned and stored (e.g. digitised) in the memory of the control unit. The closed loop control process may comprise performing repeated steps. One of the repeated steps of the closed loop control process may comprise detecting the relative positions of the bevelled ends of the pipes as the ends are moved together. One of the repeated steps of the closed loop control process may comprise the control unit ascertaining the relative movement between the pipes required to bring them into closer alignment, for example in view of a target orientation. The relative movement may be ascertained with the use of the relative positions of the bevelled ends so detected. The relative movement may be ascertained with the use of the shapes of the bevelled ends of the first pipe and the second pipe stored in the memory of the control unit. The control unit sends instructions to cause the pipe-handling apparatus to effect at least some of such relative movement so ascertained. The steps of the closed loop control process may be repeated several times, for example at least three times, and preferably more than five times.

At least some of the above mentioned methods may be wholly, or partially, automated. For example, the initial positioning of the pipes in an end-to-end configuration may be achieved automatically using actuators and sensors on the pipe handling equipment. For example, the initial positioning may be effected automatically by using a pipe end position measurement system which employs fixed cameras or laser profilers, which may be located in fixed position(s) relative to the firing line. An advantage of automated initial positioning is that it may speed up pipeline laying operations.

In certain embodiments, there may be rough alignment of the pipes (e.g. initial positioning) before the pipes are precisely aligned in a position ready for welding. The rough alignment of the pipes may be assisted or performed by a first apparatus (e.g. the above-mentioned pipe handling equipment) and the precise alignment by a second different apparatus (e.g. including different/extra cameras), which may or may not share components with the first apparatus. It may be that the alignment of the pipes when assisted or performed by apparatus is only assisted by or performed with the same vision/position-sensing apparatus, there being no clear distinction between a rough alignment and a precise alignment of the pipes by that apparatus. In some embodiments, rough alignment may be performed manually, with no apparatus being used to aid visual alignment at that stage.

The method may include a step of recording data representative of the hi-lo and/or gap measurements and/or characteristics of each joint welded in a memory storage device, for example one being accessible by or forming part of the control unit used in performance of the method. The recorded data may be used for reporting on the quality of the weld (e.g. in a welding quality report).

It should be noted that the steps of the method of the present invention may be conducted in the order specified in the claims of this patent specification. If the context permits, the steps may be performed in a differing order and/or some steps may be started before another different step is finished.

A further aspect of the invention provides a control unit configured for use in any of the methods described or claimed with reference to the present invention. Such a control unit may be programmed with control software. Such software may enable the control unit to ascertain the relative movement between pipes (e.g. a pipe and pipeline) required to align them in accordance with a target orientation. The control unit may comprise a computer. The control unit may comprise a computer processor. The control unit may comprise a programmable logic controller. The control unit may be formed by separate pieces of hardware. The separate pieces of hardware may be spaced apart, but in signal/data communication with each other. The control unit may comprises a pipe marking module to control marking of the pipes. The control unit may comprises a pipe scanning module for controlling the scanning of the 3-D shape of the bevelled ends of the pipes. The control unit may comprises a code-reader module for controlling the reading of one or more machine readable codes on the pipe. The control unit may comprises a pipe-handling strategy module.

A computer program product comprising control software for the control unit is also provided. Such a computer program product may comprise, in software, the aforementioned pipe handling strategy. The present invention may also provide a computer software product arranged, when executed on a computer that is or defines part of a control unit, causes that control unit to be arranged for use as the control unit according to any of the aspect of the method or apparatus of the invention as described or claimed herein.

There is also provided a pipe-laying vessel configured for use in any of the methods described or claimed with reference to the present invention. The vessel may include one or more items of pipe holding equipment, for example tensioners, for holding the end of a pipeline. The vessel may include pipe handling equipment for moving a pipe, for example towards a free end of a pipeline. The vessel may include a control unit, for example a control unit as described herein. The control unit may include memory for storage of data concerning the shape(s) of one or more bevelled ends of the pipe(s). The vessel may include one or more reader devices for reading two or more machine readable codes on such a pipe. The pipe handling equipment of such a vessel may be arranged to move a pipe towards a pipeline, under the control of the control unit and with the use of the two or more machine readable codes on such a pipe and data stored in the memory of the control unit. The vessel may include apparatus on which the reader is mounted. The vessel may include apparatus on which is mounted a scanning device for scanning (digitising) the shape of a bevelled end of a pipe. The apparatus, in either case, may be in the form of a frame, for example, a frame on which multiple reader devices/ scanning devices—or parts thereof—may be mounted. The scanning device(s) may comprise robot arms configured for rotating about a pipe. There may be multiple such apparatus. The or each apparatus may be generally ring-shaped. The or each apparatus may be in form of a rigid frame. The multiple such apparatus may configurable such that the apparatuses are rigidly tied together. The tying together of the apparatuses in this manner could be conducted after the pipes have been moved to their aligned position. Multiple such apparatuses may be configured so that one is movable relative to the other. Each apparatus may have its own control device. Such control devices may communicate with each other. There may be a single frame on which is mounted six or more reader devices for reading three or more machine readable codes on one pipe at the same time as reading three or more machine readable codes on another pipe. There may be two frames, each carrying three or more reader devices for reading three or more machine readable codes on one pipe. The or each frame may be ring-shaped. The ring-shaped frames may be moveable in a direction along the pipe axis. Thus, one or more reader devices may be provided on a ring structure that in use surrounds the exterior circumference of a pipe. The ring structure may have at least two readers fixed in position at different spaced-apart locations around the circumference of the ring structure, the distance between such locations thus being fixed. A control unit may communicate with more than one such frame. The pipe-laying vessel may include one or more pipe clamps, for example including an internal line-up clamp. The vessel may include a pipe-marking machine for applying machine readable codes on a pipe.

There is also provided a pipe-marking reader comprising a ring structure having at least two reader devices fixed in position at different spaced-apart locations around the circumference of the ring structure (and therefore when in use and stationary relative to a pipe, each reader device also being in fixed position at different spaced-apart locations around the circumference of the pipe), the distance between such locations being fixed. The reader devices and/or the ring structure may be as described herein with reference to other aspects of the invention.

The present invention also provides a kit of parts comprising one or more pipes, each pipe having a plurality of machine readable codes located at positions distributed around the circumference of an end of the pipe. The kit may also comprise a memory in which data concerning the shapes of the bevelled end(s) of the pipe(s) are stored. Such data may be configured so as to provide a link (directly or indirectly) between each code on a pipe and the shape of the bevelled end of that pipe at a region corresponding to the location around the circumference of the pipe of that code. For example, each code on the pipe may link to a circumferential position that is defined with reference to a coordinate system and the shape of the bevelled end of that pipe may also be defined with reference to the same coordinate system.

It will of course be appreciated that features described in relation to one aspect of the present invention may be incorporated into other aspects of the present invention. For example, the method of the invention may incorporate any of the features described with reference to the apparatus of the invention and vice versa. Also, by way of example, methods according to one aspect of the invention may incorporate any of the features described with reference to methods according to other aspects of the invention.

DESCRIPTION OF THE DRAWINGS

Embodiments of the present invention will now be described by way of example only with reference to the accompanying schematic drawings of which:

FIG. 2 shows a side view of a pipeline laying vessel and pipe handling apparatus according to a first embodiment of the invention;

DETAILED DESCRIPTION

Figure 1A:
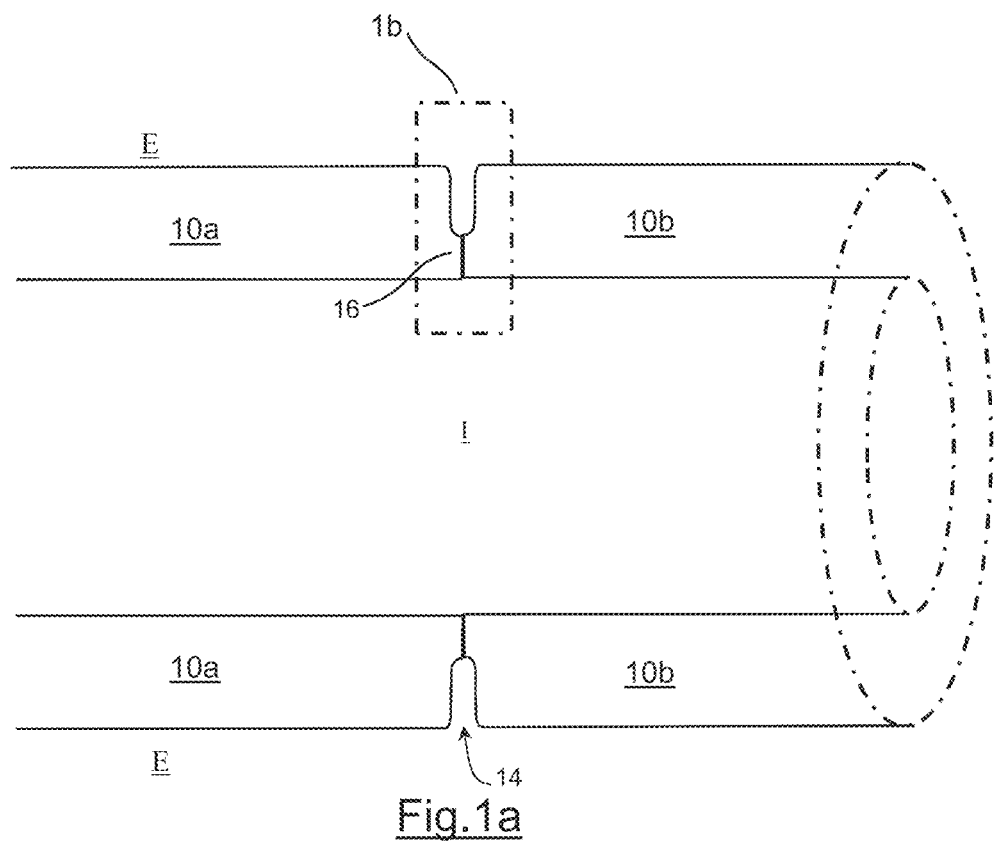
FIG. 1a shows a cross section view of two pipes arranged end-to-end.
Figure 1B:
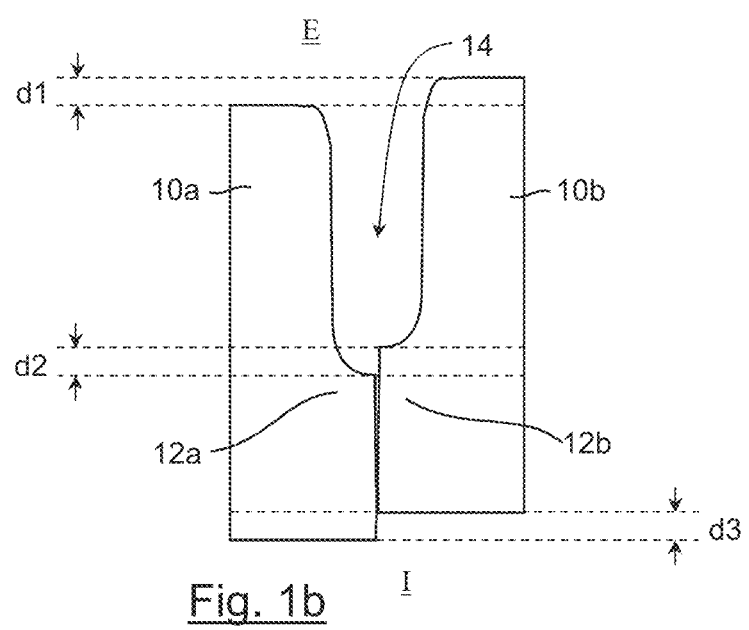
FIG. 1b shows a partial cross section view of two pipes arranged end-to-end showing measurable hi-lo distances.
Figure 1C:
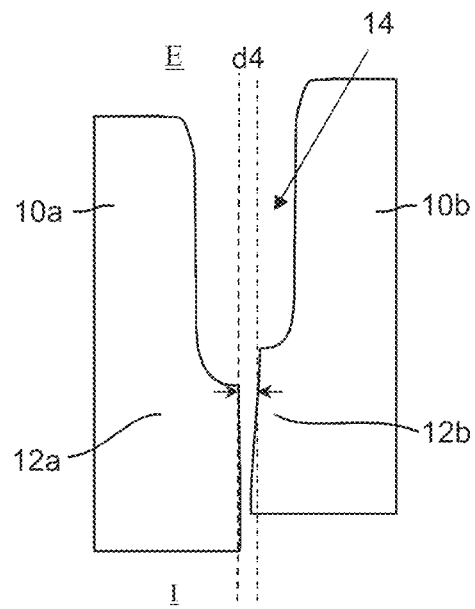
FIG. 1c shows a partial cross section view of two pipes arranged end-to-end showing measurable gap distances.
Figure 1D:
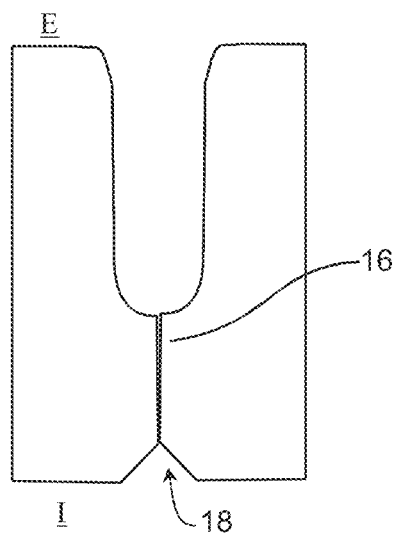
FIG. 1d is a partial cross section view of two pipes arranged end-to-end having a different bevel geometry from that shown in FIGS. 1a to 1c.

FIG. 2 shows a pipe laying vessel 20 laying a pipeline 22 in water 24 using an S-lay process. It will be seen that the pipeline 22 forms the general shape of an "S" as it is laid off the vessel 20 towards the seabed 26. The first embodiment concerns a method of S-laying the pipeline 22 in which sections 28 of pipe are successively welded to the end of the pipeline 22 as the pipeline is laid from the vessel 20.

The sections 28 of pipe added to the pipeline 22 (string) are each conventionally 12 m long (but could be multiples of 12 m in other embodiments, or any other length). The processes associated with the welding of the joint are split across several working stations 32 (one of which being a pipe coupling stations), equi-spaced with respect to the conventional joint length and included within the string production line (firing line). Tensioners 34 hold the pipeline 22 under tension.

The pipe coupling station utilizes one or more GMAW (Gas Metal Arc Welding) automated welding torches, which weld together the pipes with the use of filler material (welding wire) and the base metal of the pipe, which is melted during the welding process. Shielding of the welding is obtained from an external supplied gas or gas mixture.

Figure 1E:
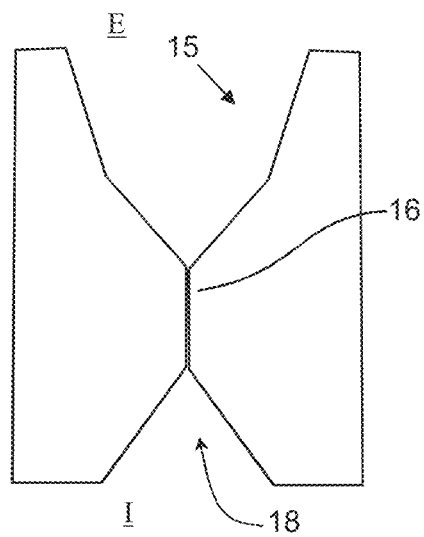
FIG. 1e is a partial cross section view of two pipes arranged end-to-end having a yet another different bevel geometry from that shown in FIGS. 1a to 1c.

The ends of the pipes are bevelled in the manner as shown in any of FIGS. 1*a* to 1*e* so that when aligned end-to-end, a V-shaped or U-shaped joint 14 is formed (the joint to be welded). Bevel geometries providing a relatively narrow welding joint 14 with almost vertical walls (like that shown in FIG. 1) means that less filler material may be required in comparison to more open bevel geometries, as typically seen with V-shaped joints. However, such a narrow geometry makes the forming of a good quality root weld more difficult. As mentioned above high accuracy of alignment of the pipe ends is also required for the weld to be of sufficient quality. The bevel of FIG. 1*e* is shown with an arrow that points to show the general location of the shoulder 15 of the bevel of one of the pipes.

First a pipe 50 is analysed at an analysing station on the vessel 20. The analysing station is located separately from the firing line. Pipes 50 are analysed at the analysing station before being sent to and processed in the firing line. The pipe 50 has two ends, both of which having been bevelled. The bevelling may be conducted at a bevelling station on the vessel 20. In this case the pipe has an outer diameter of 400 mm.

Figure 3:
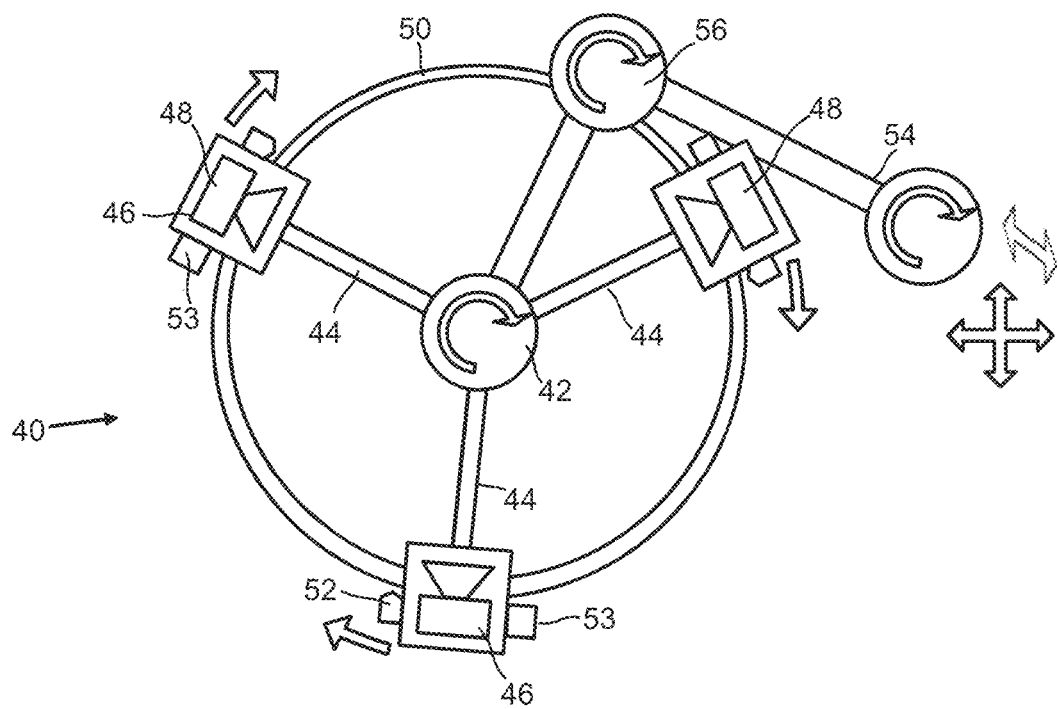
FIG. 3 shows a scanning machine according to a first embodiment of the invention when viewed along the longitudinal axis of a pipe.

With reference to FIG. 3, a scanning machine 40 scans the shape of each end of the pipe 50. The scanning machine 40 has a central hub 42 from which three arms 44 extend. The arms 44 are spaced apart by an angular separation of 120 degrees and rotate together, maintaining that separation, about the hub 42. At the end of each arm 44 is a scanning unit 46. Each scanning unit 46 comprises a laser profilometer 48, a laser marking device 52, and a seam sensing camera 53. The hub 42 is moveable in three dimensions by a robot arm 54 which includes an elbow joint 56.

In alternative embodiments, a first arm carries the laser profilometer 48, a second arm carries the laser marking device 52, and a third arm carries the seam sensing camera 53. In other words, the devices are spread across the three arms.

The hub 42 is aligned with the axis of the pipe 50 and the laser profilometers 48 are arranged directly adjacent to the circumference of the pipe end. Once in position, the arms 44 each rotate through 120 degrees, so that the entire circumference in analysed by the three scanning units 46. As the arms rotate, the laser marking device 52 prints an image on the circumference every 3 degrees of a unique machine readable code.

Figure 4:
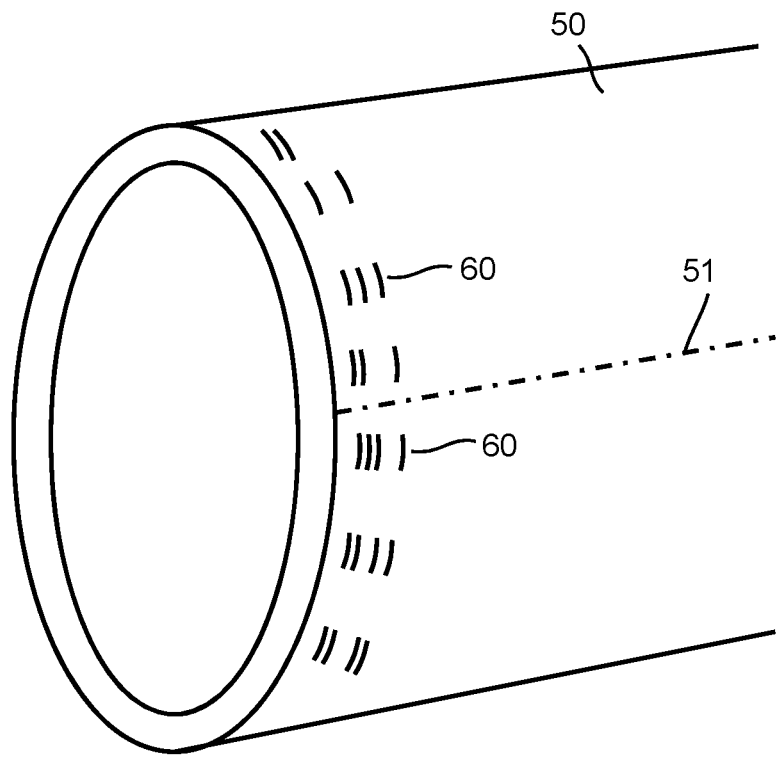
FIG. 4 shows a perspective view of the end of the pipe having machine readable codes marked thereon according to a first embodiment of the invention.
Figure 5:
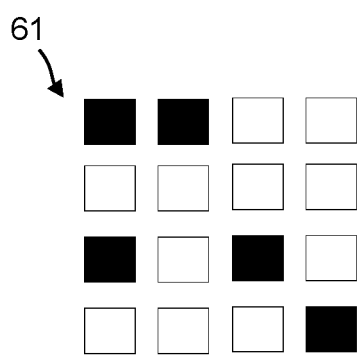
FIG. 5 shows a square array code according to an alternative embodiment of the invention.

FIG. 4 shows (schematically) seven such codes 60 on a pipe 50. The codes 60 as shown in FIG. 4 are in the form of 8-bit bar-codes (providing 256 different code combinations). QR codes could alternatively be used. FIG. 5 shown a further alternative configuration of a square array code 61 that would provide a 16-bit code. Each code has a discernible centre and orientation.

The geometry of the pipe end is scanned and digitised with the use of the laser profilometers 48. The digitised pipe end geometry and the positions of the codes 60 relative to the digitised pipe end geometry are stored in computer memory. This subsequently enables the shape and position in 3-D space of the bevelled end to be computer-modelled once the position of three only of the machine readable codes is ascertained.

The seam sensing camera 53 identifies the location of the longitudinal weld (seam) of the pipe, by means of detecting the circumferential position of a line that is manually applied to the pipe in advance. In its simplest form the line is a white line that is painted on, and detectable by means of the contrast between the white line and the surrounding steel surface of the pipe. In other embodiments a fluorescent paint is used which fluoresces when illuminated with UV light, allowing the line to be reliably detected with a seam sensing camera 53. In other alternative embodiments, the positon of the seam is marked by means of a code on the surface of the pipe, inside the end of the pipe, the code both representing the seam position and the identity of the pipe. In certain applications, the longitudinal welds of adjacent pipes must be offset by a certain number of degrees, thus the location of the weld seam must be accounted for when determining the target alignment. In alternative embodiments the seam sensing camera 53 is replaced by other devices capable of locating the longitudinal weld directly (i.e. without needing to have a line manually applied to the pipe in advance), for example by means of using X-ray radiation. In certain applications, for example with seamless pipes, the device could be omitted entirely.

In the present embodiment one scanning machine 40 scans both ends of the pipe 50, one end of the pipe 50 being scanned first and the other end being scanned thereafter. In alternative embodiments, two scanning machines 40 can be provided so that both ends of the pipe 50 can be scanned at the same time.

Before the pipe 50 is passed into the firing line, the scanned shape of the bevelled end is analysed by a control unit (programmed with software) to calculate the best possible fit with the end of the pipeline 22, the end of which also having been scanned and digitised. If the best fit so calculated fails to meet quality criteria (e.g. acceptance criteria), for example if the maximum hi-lo value of the pipe joint that would be formed is too high, then the pipe 50 is replaced with a different pipe. The best fit position also ensures that the longitudinal seams 51 of adjacent pipes are further than 50 mm apart along the circumference. The best fit so calculated, if it meets the quality criteria, will determine the target orientation of the pipe 50 relative to the pipeline 22 for the alignment steps that will now be described.

Figure 6:
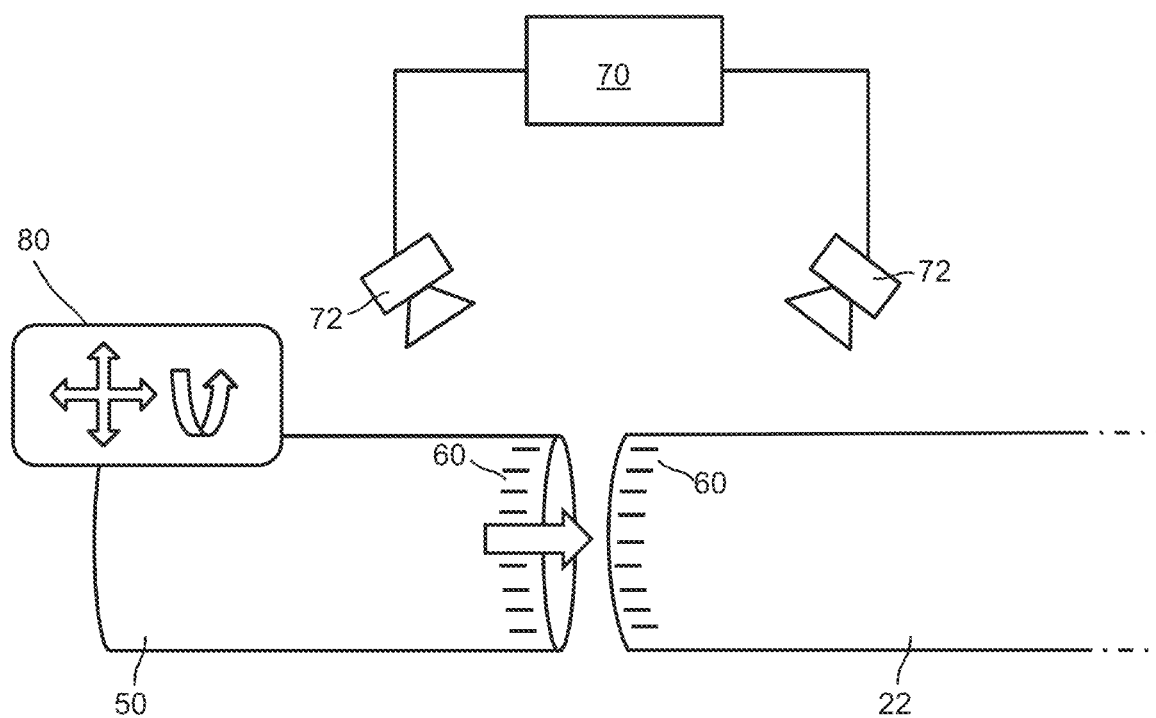
FIG. 6 shows a side view of a pipe adjacent to the end of a pipeline at a pipe coupling station according to a first embodiment of the invention.

FIG. 6 shows a section of pipe 50 adjacent to the end of the pipeline 22 held on the vessel 20, at a pipe coupling station on the vessel 20. The pipe 50 is marked with machine readable codes 60 and has a bevelled end with a shape that has already been scanned and stored in computer memory as described above with reference to FIG. 5. The end of the pipe 50 is aligned with the end of the pipeline 22 under the control of a control unit 70 (in accordance with software that has programmed the control unit). The end of the pipeline 22 is similarly marked with codes 60.

Two sensor units 72 are provided, one sensor unit 72 primarily for viewing the end of the pipe 50 and one sensor unit 72 primarily for viewing the end of the pipeline 22. The sensor units 72 work to a common coordinate system and have been pre-calibrated for that purpose. The sensor units 72 are mounted so that they move with the end of the pipeline 22 (relative to the vessel).

Each sensor unit 72 has the ability to read and locate the position of at least three of the machine readable codes 60 in the common coordinate system. In this embodiment, this is achieved with the provision of a proximity sensor, a laser profilometer (including laser transmitter and camera/sensor) and a reader in the form of a camera. The camera detects the location of a code 60 relative to the pipe 50, which thus allows the rotational position of the pipe (about its longitudinal axis) to be determined to within an accuracy of, say, +/−1 degrees. The proximity sensor and the laser profilometer detect the shape of a portion of the pipe bevel (for example a portion that encompasses the outer diameter of the pipe but not the inner diameter) and the position of that portion of the pipe bevel in 3-D space. A specific point, or edge, on the portion detected may be located—for example, at the junction (edge) between the outer diameter of the pipe and the start of the bevel. The location of this junction (edge) may be used as a reference point to ascertain the position of the pipe in 3-D space. The circumferential position of the pipe is known with reasonable accuracy. With the knowledge of two such reference points (three reference points could alternatively be used) in combination with the knowledge of the rotational position of the pipe, the control unit 70 can extract the full position information of the entire scan of the surface of the bevelled end of the pipe in the coordinate system of the sensor units 72. With the use of the data representing the previously scanned shape of the entire bevel, the position of the rest of the pipe bevel may be ascertained, which can assist in calculating the internal hi-lo value when the pipe ends are eventually positioned against in other in alignment.

In alternative embodiments, the camera of the sensor unit 72 may be replaced with another type of reader which is configured to read the codes. For example, the camera could be replaced with a barcode scanner, for example comprising a scanning laser and photo-diode arrangement.

The end of the pipeline 22 is held by the vessel 20. The end may be allowed to move in a controlled manner relative to the vessel 20 to accommodate movement of the vessel 20 caused by the sea (e.g. surging motion).

Alignment of the end of the pipe 50 with the end of the pipeline 22 is effected by means of pipe handling equipment 80 which is able to rotate the pipe 50 about its longitudinal axis, to translate the pipe 50 in three orthogonal directions and also to rotate the pipe 50 about two orthogonal axes that are perpendicular to the longitudinal axis of the pipe 50.

As an initial step, the position of the pipe 50 is detected and then the pipe 50 is rotated about its longitudinal axis in accordance with the target orientation, already calculated. An internal line-up clamp (not shown in FIG. 6)—an "ILUC"—is moved into position and a welding band (not shown in FIG. 6) is installed on the pipe 50 and/or the pipeline 22.

The alignment of the pipe 50 relative to the free end of the pipeline 22 is conducted under the control of the control unit 70 using a closed loop control method. Thus as the pipe 50 moves towards the pipeline 22, the relative positions of the ends of the pipe 50 and of the pipeline 22 are continuously detected and monitored. The control unit 70 recalculates, during the movement, the relative movement required to bring the ends into alignment in accordance with the target orientation. Each such calculation uses the position of the ends as calculated using the known circumferential position of the pipes, and the detected position of the end of the pipe 50 as detected with one of the sensor units and the detected position of the end of the pipeline 22 as detected with the other of the sensor units 72.

Figure 7:
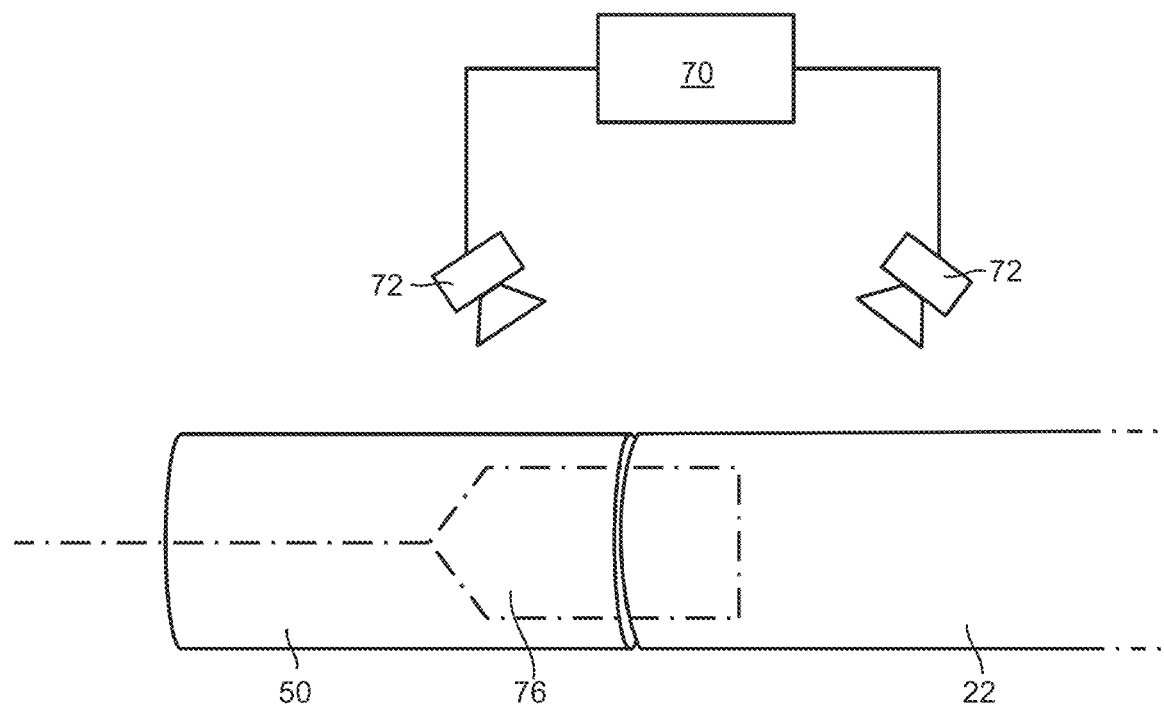
FIG. 7 shows a side view of a pipe aligned with the end of a pipeline at a pipe coupling station according to a first embodiment of the invention.

FIG. 7 shows the pipes (pipe 50 and pipeline 22) in their final aligned positions. The ILUC 76 engages and clamps both the interior surface of the end of the pipe 50 and the interior surface of the end of the pipeline 22. The relative positions of the pipe 50 and the pipeline 22 are detected with the sensor units 72 and are checked by the control unit 70 in comparison with the intended relative positions according to the target orientation. Any error between the actual end positions and the target orientation is recorded and used to improve the control process by means of a machine-learning process as will be described in further detail below. If there is an error between the actual end positions and the target orientation, then a calculation is performed to ascertain whether the actual end positions of the pipes are such that a weld joint of sufficient quality can still be made; if not, the ILUC is released and the pipes are moved to reduce the error.

The sensor units 72 view the relative positions of the pipes when aligned both before and after the ILUC clamps are fully engaged. The control unit 70 effectively constructs a computer model of the bevel geometry and calculates the internal hi-lo—and other parameters—to check that the weld joint is sufficiently aligned.

Figure 8:
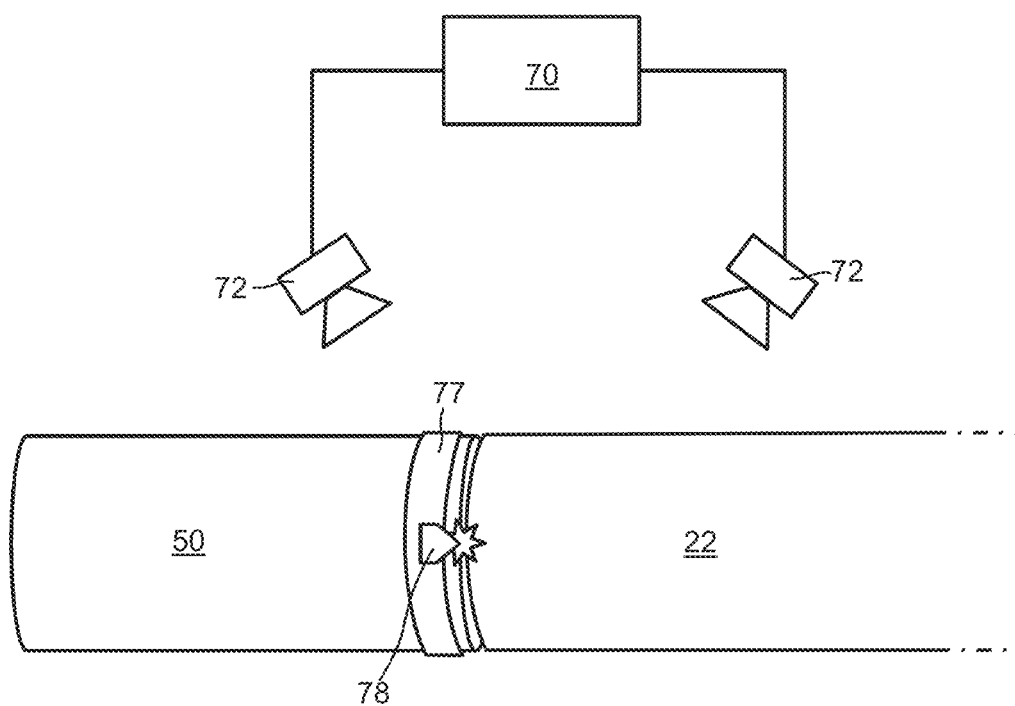
FIG. 8 shows a side view of a pipe and pipeline according to a first embodiment of the invention being welded together.

Once the ILUC is engaged, and it has been confirmed that the pipes are sufficiently aligned in accordance with the target orientation, the pipes are welded together. FIG. 8 shows a welding bug 78 revolving around the pipe 50 on a welding belt 77 and welding the two pipes together.

The apparatus and method as described with reference to FIGS. 2 to 8 provide a means for aligning and then welding together pipe sections for laying a pipeline from an S-lay vessel having several advantages over the prior art. The method enable pipes to be aligned and coupled (welded together) with high accuracy in a reliably repeatable manner, due to the continuous measurement of the geometry and position of the pipe ends as they move towards the target alignment, whilst only requiring small regions of each pipe end to be viewed, because the geometry and relative position can be calculated from the 3-D computer model scanned into memory of the control unit. Only needing to view small regions of each pipe end allows the use of sensors/cameras that can remain essentially static relative to the pipe end during use. Such sensors/cameras do not need to revolve around the pipe ends during the time in which the pipes are in the firing line, and, as such, speed and efficiency can be improved. Reducing human interaction assists in improving the coupling operation, in terms of accuracy, speed and repeatability. Movement of the end of the pipeline as a result of surge can be accommodated for automatically and does not affect the accuracy of line-up because both the pipeline end and the end of the pipe to be jointed thereto are analysed, modelled and then tracked in real-time. There is no need for the cameras/sensors for viewing the bevelled ends when the pipes are in the firing line to be positioned directly in between the ends as they approach each other, nor need they directly view the interior of each pipe. Such an arrangement simplifies operations in the firing line. Analysing the suitability of a pipe for coupling to the end of the pipeline is conducted before the pipe is allowed to be sent to the firing line, thus allowing unsuitable sections of pipe to be identified early.

Figure 9:
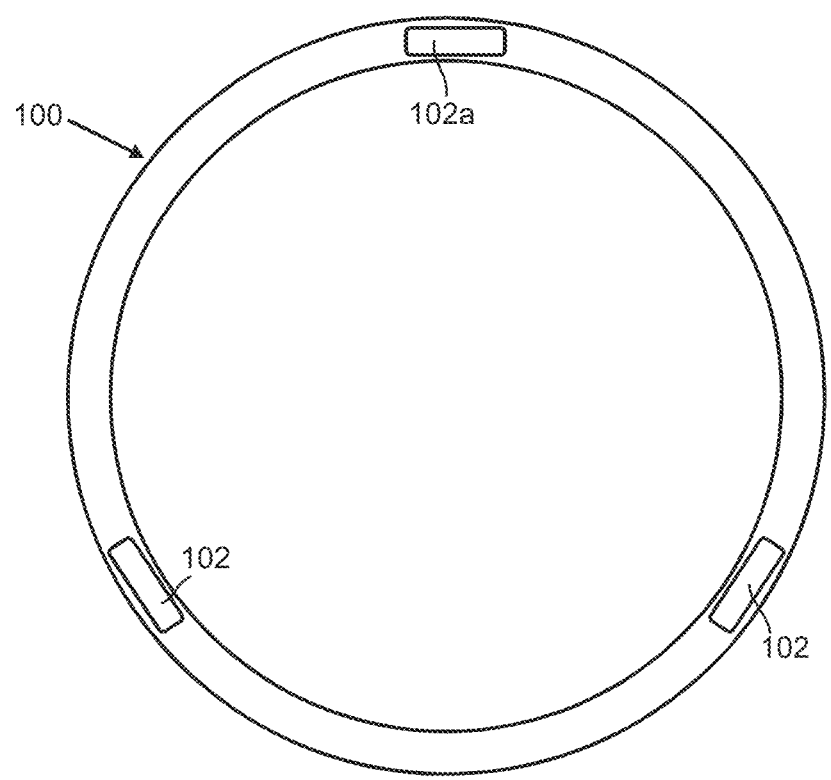
FIG. 9 shows a pipe viewing system according to a second embodiment of the invention when looking along the longitudinal axis of a pipe.
Figure 10:
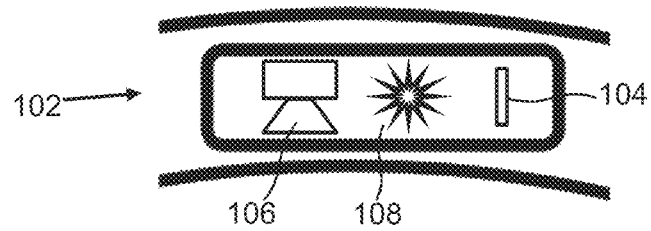
FIG. 10 shows an instrument block of the pipe viewing system according to a second embodiment of the invention when viewed along the longitudinal axis of a pipe.
Figure 11:
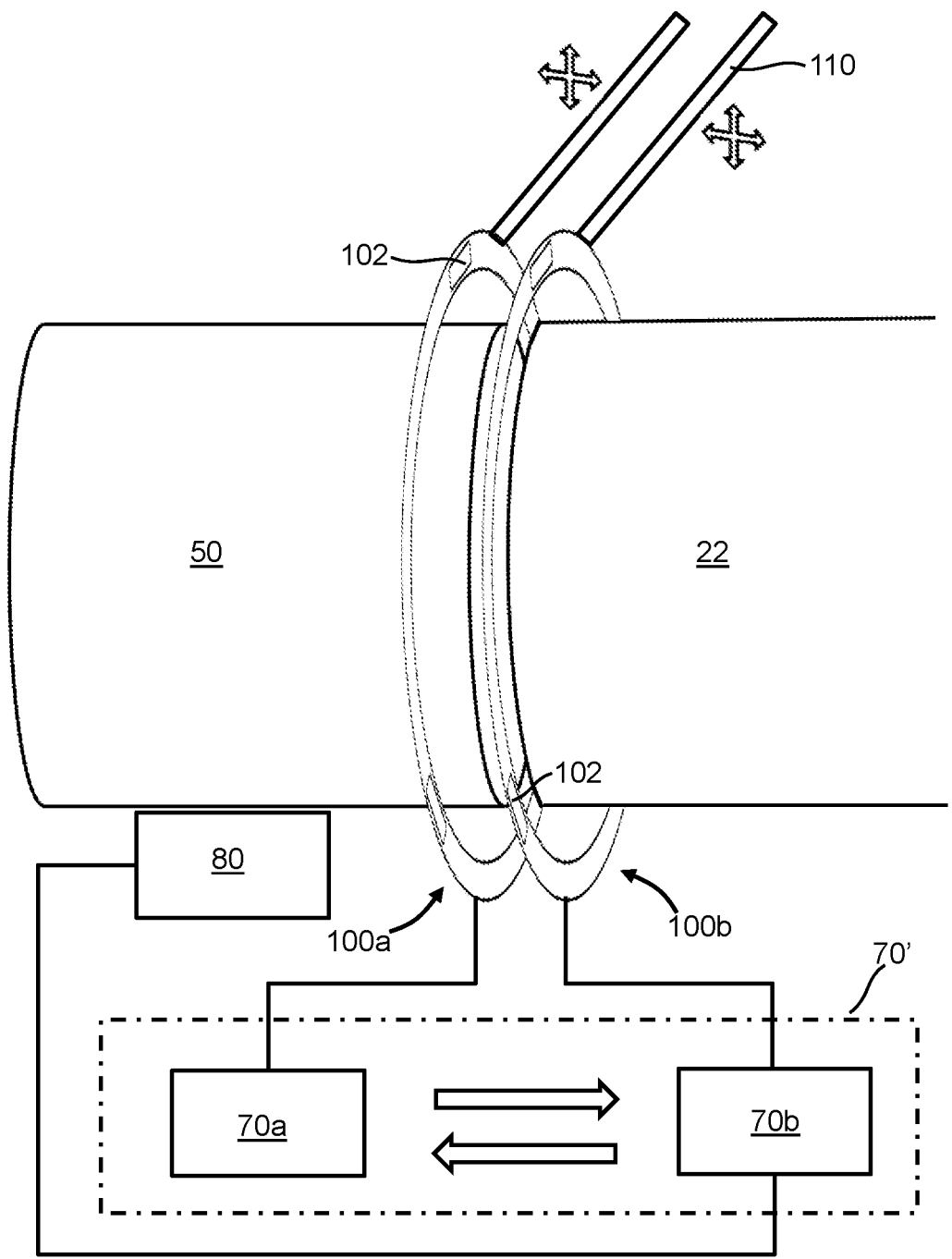
FIG. 11 shows a side view of a pipe aligned with the end of a pipeline at a pipe viewing system according to a second embodiment of the invention.

FIGS. 9 to 11 show, in accordance with a second embodiment, a particular construction of a pipe viewing system for use at the pipe coupling station, for example for use as the sensor units 72 as described in relation to FIGS. 6 to 8.

The pipe viewing system in this case is based on a ring-shaped apparatus 100 which has three instrument blocks 102 arranged 120 degrees apart around the ring. The ring has an inner diameter which is at least 20 mm wider than the outer diameter of the largest diameter pipe with which the ring will be used (in this embodiment its inner diameter is 600 mm, and therefore 200 mm wider than the 400 mm diameter pipe). The ring is thus radially spaced apart from the pipe by ~100 mm. The position of each instrument block 102 around the ring is fixed during use and the rotational orientation of the ring 100 (about its axis) during use remains the same. As such, the top instrument block 102a at the 0 degrees position remains at the 0 degrees position on the ring during use.

With reference to FIG. 10, each instrument block 102 includes a proximity sensor 104 to detect the presence of a pipe, a camera 106 for reading the machine readable codes on the pipe end, and a laser profilometer 108 to measure the distance away of the pipe and for recognising the local shape of a portion of the bevelled end of a pipe. In use, two pipe viewing apparatuses 100 are used to view the ends of the pipes. It may be that one of the three instrument blocks 102 is provided for the purposes of redundancy for example allowing continued operation even if one of the other two instrument blocks fail or are otherwise rendered inoperable (for example one block might be rendered temporarily inoperable as a result of human operations on the pipe that temporarily "blind" the block).

With reference to FIG. 11, a first pipe viewing apparatus 100a is positioned near the end of a new section of pipe 50 for welding to the end of the pipeline 22 and a second pipe viewing apparatus 100b is positioned near the end of the pipeline 22. When the pipe 50 and pipeline are space apart the apparatus 100a views the pipe 50 and the apparatus 100b views the pipeline 22. In the position when the pipes are aligned (just before ILUC expansion) or close to being aligned (as shown in FIG. 11), the first pipe viewing apparatus 100a can view the end of the pipeline 22, and the second pipe viewing apparatus 100b can view the end of the new section of pipe 50. Thus, when pipe ends are very close to each other, each pipe viewing apparatus 100 is able to view the end of the pipe opposite it.

Each pipe viewing apparatus 100 is mounted on a robot arm 110 able to move the apparatus 100 in three orthogonal directions and into and out of the firing line. Each robot arm 110 (illustrated highly schematically in FIG. 11) is mounted on a linear motorised track aligned with the pipe axes in the firing line. In use, the pipe viewing apparatus 100 is able to move itself to automatically align itself with the bevelled end it needs to view. If the end of the pipeline 22 moves relative to the vessel due to the tensioners and/or surge movement, then the apparatus 100b moves with the pipeline 22. The pipe handling equipment (illustrated schematically only in FIG. 11 by box 80) also automatically compensates for movement of the pipeline 22 relative to the vessel 20 and pipe viewing apparatus 100a tracks the movement, and moves with the movement of the pipe 50. All such movements are controlled under the control of the control system 70' which in this case is provide by control units 70a, 70b of the respective pipe viewing apparatuses 100a, 100b. The control units 70a, 70b of the respective apparatuses 100a, 100b are in communication with each other.

On the basis of the bevel geometry data previously acquired by the analysis station and data from the instruments of the pipe viewing apparatuses 100, the control system 70' manages the continuous movement of the alignment machines, including the pipe handling equipment 80, to bring the pipes to their target alignment. Initial positioning in the firing line and the initial rotation of the pipe section 50 about its axis to match the rotational position of the target orientation is automatically conducted on the basis of positional data provided by the pipe viewing apparatuses 100a. Pipe viewing apparatus 100b searches for and detects the end of the pipeline 22. Each pipe viewing apparatus 100 can ascertain the relative rotational position of the pipe end (about the pipe axis) by means of detecting the machine readable code which will determine the rotational position of the pipe to within an accuracy of less than 1 degree. The laser profilometers detect the position of a particular point on the local bevel shape, which with the use of the previously scanned shape of the bevel and the knowledge of the circumferential position as provided by the scanning of the codes, the position and orientation of pipe end in 3-D space can be calculated to within 0.1 mm.

When the pipe 50 and pipeline 22 are finally moved in accordance with the target position, the ILUC is expanded into its clamping configuration and the positions of the pipe ends are again detected. In order to improve the accuracy and reliability of this final viewing and measuring of the alignment of the pipe ends, the two pipe viewing apparatuses 100a, 100b are rigidly tied together with one or more rigid bars that link viewing apparatuses 100a, 100b in a calibrated manner. The aim of having a common coordinate system for the two pipe viewing apparatuses 100a, 100b may be more readily and reliably be achieved when the apparatuses are tied together in this manner. With the use of the scanned bevel geometry of both ends, the control system 70' calculates the Hi-Lo and Gap parameters to check if they meet predefine quality criteria and/or expected values as predicted in view of the target orientation. If the parameters are out of tolerance, then the ILUC is opened and final alignment steps are repeated. A different (alternative) alignment solution—which should in theory also meet the acceptance/tolerance criteria—may be used to align the pipes. If there is a measurable misalignment that can be corrected, a correcting movement may instead be made. Once the alignment is successfully completed with ILUC in clamping configuration and the alignment parameters are calculated to be within target, the welding phase begins. There is—for the reasons mentioned above—no need for the instrument blocks 102 to revolve around the pipes during use.

Figure 12:
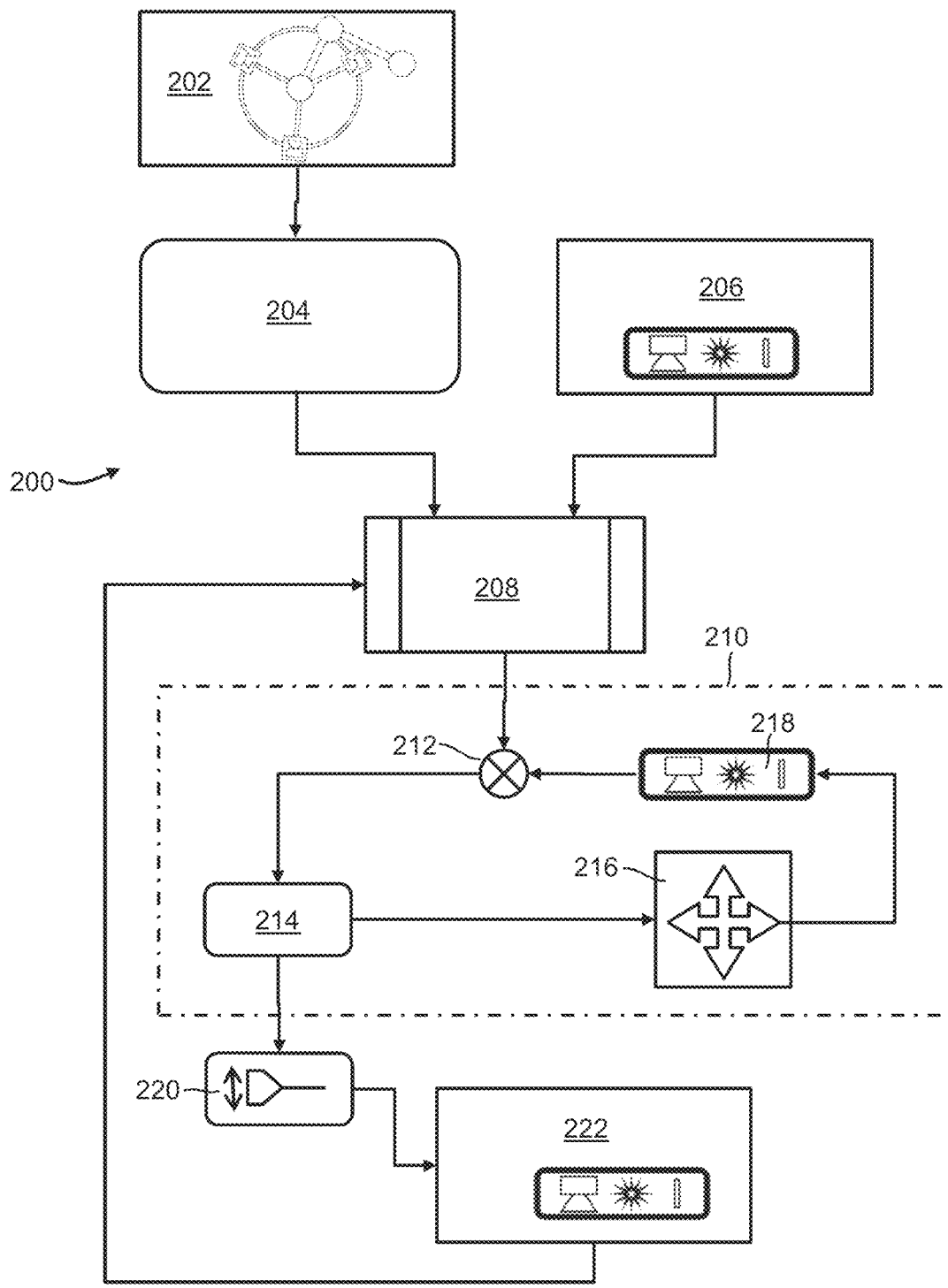
FIG. 12 shows the steps of a method according to a third embodiment of the invention.

FIG. 12 illustrates a third embodiment of the present invention, based on the first embodiment but additionally using process data and machine-learning to improve the efficiency and accuracy of future operations. There is shown a flow diagram 200 illustrating the method used.

At an analysing station, the bevelled ends geometry of a new pipe are scanned/measured and digitised (step 202). A control unit then calculates the best-fit between the end of the new pipe and the end of the pipeline which has previously been scanned (step 204), and determines a target orientation as regards the relative positions of the bevelled ends when coupled together in accordance with the best-fit. The best-fit is calculated to minimise gap and hi-lo parameters.

The pipe is then brought into the firing line. In the firing line, both the position of the end of the pipeline and the position of the end of the new section of pipe are measured (step 206). A pipe handling strategy 208 is used to determine the relative movements which will most efficiently and accurately attain the target orientation, in view of all data available including aspects such as pipe type, weight, tension in the pipeline etc. The pipe handling strategy 208 not only calculates how best to move the pipe ends towards each other but also calculates the control signals to send to the various pieces of pipe handling equipment.

As part of a continuous closed loop control method 210, software controlling the pipe handling equipment (e.g. rollers, ILUC, etc.) continuously compares the expected new pipe end position with the position as actually measured and updates the relative movements required. Thus, the loop starts (212) with the use of the initial positions, the pipe handling strategy 208 and the relative movement instructions already calculated to provide instructions (step 214) to effect movement (step 216) of the new pipe towards it target position. The position is viewed and calculated (step 218). This actual position as measured is then compared to the expected position. Any difference (error) between the actual and expected positions is recorded and compensated for in the loop. Thus, the software calculates updated instructions (step 214) in view of the error. Movement is again effected (step 216) and the new positions measured (step 218) with the loop repeating until it is determined that the target orientation has been reached.

The ILUC is then expanded so that the new section of pipe and the pipeline are firmly clamped together (step 220). A final check is then made of the positions of the pipe ends, with the pipe viewing apparatus (step 222). Assuming that that target orientation, and target alignment, have been achieved, the pipe handling strategy is updated in view of the errors noted between measured and expected positions. Thus, the software corrects the pipe handling strategy with the use of machine learning techniques to continuously update control rules and strategies of pipe movements, so as to improve efficiency and accuracy. Initially the control process parameters that affect how a machine/motor moves a pipe section, and how the vision system interprets measured data, are all set at estimated/tentative reasonable values. During operations in the field, the control process parameters are continuously tuned and verified utilising the measurement data resulting during each pipe coupling operation. In such a way, the transfer function of each degree of freedom of the line-up roller, with the specific pipe size and weight, is continuously updated during each coupling operation. Data for each type of pipe (pipe family) are saved in a database for future use with pipes of the same type.

Figure 13:
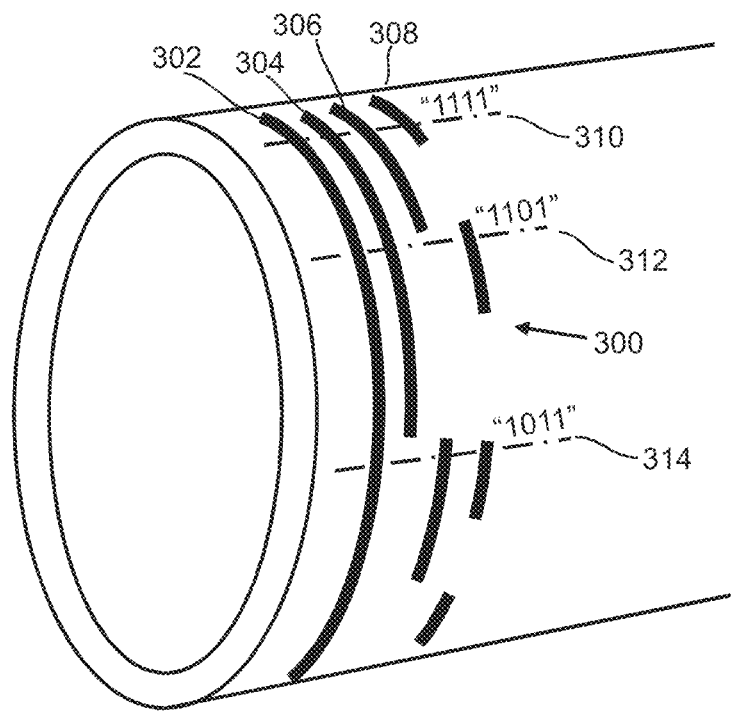
FIG. 13 shows a perspective view of the end of the pipe having machine readable codes marked thereon according to a further alternative embodiment of the invention.

FIG. 13 shows an alternative method of pipe marking in which all regions of the circumference of the pipe are marked with a code. Such continuous marking allows the circumferential position of a pipe to be detected reliably with bar-code reading technology for example without having to accurately locate a particular discreet code to view. However, a given code will represent a range of circumferential positions around the pipe.

FIG. 13 shows schematically the marking 300 of a pipe end with a 4-bit code. One half of the pipe is marked with a black circumferential line 302 represent a "1", whereas the other half is not so marked, thus representing a zero. Line 302 is positioned at an axial position along the pipe corresponding to a first bit of the code. Further bits of the code are represented by further circumferential marks/absence of marks in rings around the pipe. Thus, lines 304, 306, and 308 are positioned at axial positions along the pipe corresponding to the second, third and fourth bits of the code. Reading the code at the circumferential position marked by broken line 310, yields a first bit that is a "1" (line 302), a second bit that is a "1" (line 304), a third bit that is a "1" (line 306) and a fourth bit that is a "1" (line 308)—the code is thus binary "1111" or 15 (in decimal). Reading the code at the circumferential position marked by broken line 312, yields the code "1101" or 13 (in decimal), because there is no mark present for the third bit (a "0"). Reading the code at the circumferential position marked by broken line 314, yields the code "1011" or 13 (in decimal), because there is no mark present for the second bit (a "0"). With a 4-bit code, there are 16 possible values, and as such the circumferential position represented by each unique code covers 22.5 degrees.

In an embodiment of the invention, a 9-bit code continuous coding is used, which provides 512 unique codes, and provides accuracy of circumferential position to within 0.7 degree. Each line is 1 mm wide in the axial direction, with the lines for successive bits being separated by 1 mm. Thus, total laser-marker spanning distance is 17 mm. This provides a reference system that can easily be recognized at the pipe coupling station and allows the correct interpretation of the relationship between the 3D point-cloud acquired by a laser profilometer of a small region of the bevel at the pipe coupling station with the 3D point-cloud of the entire bevel geometry as previously acquired by the laser profilometers at the analysis station. With the use of the previously scanned bevel geometry, the local geometry corresponding to a circumferential region of a given code can be compared to a locally measured geometry and with pattern matching software the position of the bevel can be calculated with better accuracy. The marks also allow sufficiently accurate calculation of the location of the longitudinal weld seam. The marking 300 is imprinted directly on the steel surface of the pipe's exterior with a laser marking printer, which produces a high contrast permanent mark on the pipe (oxidizing it), without affecting its integrity. A standard cleaning of the pipe surface is sufficient before printing.

The printing of a pattern along the whole circumference, instead of just few angular position, can speed up the recognition and correct evaluation of the rotational alignment in the coupling station.

According to a further embodiment, not illustrated separately, there is provided a method of aligning a pipe and a pipeline end-to-end in a position ready for welding, for example when S-laying a pipeline from a vessel at sea. The pipe and the pipeline each have an end bevelled with a shape which has been scanned and stored in memory of a control unit. The pipe has a plurality of machine readable codes located at positions distributed around the circumference of the pipe.

The method of the embodiment comprises the following steps:
moving the pipe towards the end of a pipeline,
reading at least one of the codes with a reader, and
ascertaining with the use of the control unit the relative movement between the pipe and the pipeline required to align the pipe and the end of the pipeline, in accordance with a target orientation with the use of information provided by the at least one code read by the reader, and the shapes of the bevelled ends of the pipe and the pipeline stored in the memory of the control unit.

Whilst the present invention has been described and illustrated with reference to particular embodiments, it will be appreciated by those of ordinary skill in the art that the invention lends itself to many different variations not specifically illustrated herein. By way of example only, certain possible variations will now be described.

It may be that a first pipe section is not welded to the end of the pipeline until the control unit has selected a further section of pipe that can be welded to the other end of the first section in accordance with a best fit calculated to meet pre-set quality criteria.

It may be that, during the closed loop control process that aligns a pipe with the end of a pipeline, the positions of three machine readable codes on the pipeline relative to the positions of three machine readable codes on the pipe are used to bring the pipe and pipeline to a target orientation without needing to refer to the whole scanned shape held in memory.

The marking of the machine readable codes on the pipes can be performed at the same time as, before, or after the scanning of the bevel geometry.

The machine readable codes may be printed directly onto the (side-)wall of the bevel at the end of the pipe. The bevel, when newly formed, provides a clean surface which is easier to print to. Also, the clean surface is also likely to improve the visibility (and accurate reading of) the mark, as a result of the improved contrast between, say, the black marks printed onto the pipe and the freshly machined steel surface.

The marking of the machine readable codes on the pipes could instead be performed indirectly, by marking a collar with such codes and then affixing the collar to the pipe. For example, there may be pre-printed circumferential bands that carry a suitable adhesive that allows the band to be glued to the outside of the pipe. A collar for bearing the machine readable codes may be in the form of a removable support, or could be a one-use product.

It will be appreciated that embodiments of the invention will have application in relation to joints to be welded not requiring filler material.

More than one pipe may be bevelled and marked before subsequently being passed to the firing line. Several pipes may be so prepared in parallel. In such a case, it may be desirably to mark the pipes with extra information to enable any one of a small group of pipes (up to 16, say) to be distinguished from the other. This could be achieved by adding an extra 4 bits of information to each code marked on the pipe.

In alternative embodiments, the first pipe viewing apparatus is movable (optionally via a robotic arm) along a track and the second pipe viewing apparatus is movably mounted to the first pipe viewing apparatus, or vice versa. Alternatively, the first pipe viewing apparatuses is mounted to the pipeline or pipe. The first pipe viewing apparatus therefore inherently moves with the pipeline or pipe. The second pipe viewing apparatus is then movably mounted to the first pipe viewing apparatus.

Rather than using pipe tensioners to hold the pipeline, pipe clamping apparatus (for example including a fixed clamp and/or a moveable clamp) may be used to hold the pipeline on the vessel.

In alternative embodiments, a single pipe viewing apparatus could be provided which serves both pipes. For example, the two ring-shaped apparatus shown in FIG. 11 could be combined into one ring-shaped apparatus having six instrument blocks, three being associated with viewing one pipe and the other three being associated with viewing the other pipe. A single pipe viewing apparatus for viewing both pipes could be movable along a track in a direction substantially parallel to the longitudinal axes of the pipes, or the single pipe viewing apparatus could be fixed to the vessel. The pipe viewing apparatus may comprise one or more stereoscopic cameras, this may in particular be employed in arrangements with a single fixed pipe viewing apparatus. A single viewing apparatus for both pipes could be provided in the form of one or more modules mounted to the pipeline or pipe. For example, a welding band (for guiding a moveable carriage carrying one or more welding torches) is often fixed to at least one of the pipeline and pipe. Such a welding band could be utilised to provide a convenient way of mounting the one or more modules of such a viewing apparatus. The same viewing apparatus could view both the end of a pipeline and the end of the pipe section to be welded to the pipeline, with appropriately positioned cameras for example, provided that the pipe section and the pipeline are positioned sufficiently close together.

The cameras do not need to be provided exactly 120 degrees apart on the ring-structure, provided that the position of each camera and/or the positions of objects within its field of view can be accurately ascertained with the use of calibration and/or set-up information for example.

It may be that multiple (e.g. three modules) are provided to perform the function of one (or both) of the pipe viewing apparatuses. Each module may include one or more cameras. The modules may be independently mountable in use. In such a case, there will be a step of the camera/control unit performing an initial set-up calibration step in which the positional information concerning the camera is ascertained. Such a step might include viewing a local machine-readable code on the pipe.

A pipe viewing apparatus at the coupling station need only view part of the bevel. Such a pipe viewing apparatus may comprise a profilometer (comprising an optical transmitter and an optical receiver) and additionally a camera for reading the machine-readable codes. An alternative pipe viewing apparatus may comprise a laser blade and a single camera suitable both to read the machine-readable codes and to detect and measure the reflected laser-light from the laser blade (so as to ascertain bevel profile, or part thereof).

Welding processes other than GMAW may be used.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. A method of aligning a first pipe and a second pipe end-to-end in a position ready for welding, wherein
   the first pipe and the second pipe each have an end bevelled with a shape which has been scanned and stored in a memory of a control unit,
   a plurality of machine readable codes are located at known circumferential positions distributed around a circumference of the first pipe, wherein each of the machine readable codes identifies a different circumferential position; and
   the method comprises the following steps performed after the shape of each of the bevelled ends has been scanned and stored in the memory of the control unit:
   effecting relative movement of the bevelled end of the first pipe and the bevelled end of the second pipe towards each other;
   while the bevelled ends are spaced apart:
     reading at least one of the machine readable codes with a reader,
     measuring a position of at least two different points on the first pipe, and
     determining a position and orientation of the bevelled end of the first pipe with the use of: (a) information provided by reading the at least one machine readable code with the reader, (b) the measured position of the at least two different points, and (c) the shape of the bevelled end of the first pipe stored in the memory of the control unit; and ascertaining, with use of the control unit, a relative movement between the first pipe and the second pipe required to align the first pipe and the second pipe in accordance with a target orientation that aligns the first pipe and the second pipe for welding;

wherein the first pipe has a longitudinal axis and the information provided by reading the at least one of the machine readable codes with the reader includes information about the orientation of the bevelled end of the first pipe about the longitudinal axis.

2. The method according to claim 1, wherein the step of determining the position and orientation of the bevelled end the first pipe includes use by the control unit of the circumferential position around the first pipe of the at least one machine readable code read with the reader.

3. The method according to claim 1, wherein the plurality of machine readable codes comprise at least ten unique codes such that for any given sector of the circumference spanning 36 degrees around the circumference there is at least one code.

4. The method according to claim 1, wherein the method comprises a step of the control unit using the at least one machine readable code read by the reader to ascertain information concerning the shape of the bevelled end of the first pipe at a circumferential location of the code on the first pipe.

5. The method according to claim 1, wherein at least two of, but fewer than all of, the machine readable codes on the first pipe are read and used to determine the position and orientation of the bevelled end the first pipe.

6. The method according to claim 1, wherein there are multiple readers such that multiple codes are read, substantially contemporaneously, with the use of the multiple readers.

7. The method according to claim 1, wherein there is a step of using a scanner to ascertain the shape of the bevelled end of the first pipe or the bevelled end of the second pipe.

8. The method according to claim 7, wherein the scanner is used to scan the shape of the bevelled end of the first pipe or the second pipe, and there is a step of storing data defining an electronic representation of the shape in the memory of the control unit; wherein at the same time as the scanner is used to scan the shape of the bevelled end of the first pipe or the second pipe, a pipe-marking machine is used to apply the plurality of machine readable codes on the first pipe or the second pipe having said bevelled end.

9. The method according to claim 7, wherein the method includes ascertaining a circumferential position of a longitudinal seam on the pipe so scanned, whereby the circumferential position of the longitudinal seam is related to a circumferential position of at least one of the machine readable codes.

10. The method according to claim 1, wherein the control unit ascertains the relative movement required to align the first and second pipes additionally with the use of a pipe-handling strategy held in the memory of the control unit.

11. The method according to claim 10, wherein after performing the relative movement between the first and second pipes ascertained by the control unit the following steps are performed:

measuring the quality of the alignment of the bevelled ends, sending data concerning the quality so measured to the control unit, and the control unit ascertaining what changes, if any, could be made to the instructions issued by the control unit to improve the quality so measured, and as a result updating the pipe-handling strategy.

12. The method according to claim 10, wherein the pipe-handling strategy held in the memory of the control unit has been adapted to take account one or more of: a type of pipe so used or a pipe-handling apparatus so used.

13. The method according to claim 1, wherein the method is conducted by the control unit using a closed loop control method, which comprises the repeated steps of:

determining the relative positions of the bevelled end of the first pipe and the bevelled end of the second pipe as the ends are moved towards each other, ascertaining, with use of the control unit, the relative movement between the first pipe and the second pipe required to bring the first pipe and the second pipe into closer alignment in view of the target orientation; and the control unit then causing at least some of the relative movement between the first and second pipes so ascertained.

14. A method of laying an offshore pipeline from a pipe-laying vessel, in which sections of pipe are successively welded to an end of the pipeline, and the sections of pipe are each aligned with the end of the pipeline in a position ready for welding in accordance with a method as claimed in claim 1.

15. The method according to claim 14, wherein the end of the pipeline is held by the vessel and is allowed to move relative to the vessel in response to movement of the vessel caused by the sea.

16. A control unit configured for use in the method according to claim 1, wherein the control unit comprises a memory for storage of data concerning a shape of a bevelled end of a first pipe and a shape of a bevelled end of a second pipe, and for storage of data relating a circumferential position of each of a plurality of machine readable codes distributed around a circumference of the first pipe to the shape of the bevelled end of the first pipe, wherein each of the machine readable codes identifies a different circumferential position; and wherein the control unit is programmed with control software that enables the control unit to:

determine a position and orientation of the bevelled end of the first pipe, while the bevelled end of the first pipe is spaced apart from the bevelled end of the second pipe, with the use of: (a) information provided by reading at least one of the machine readable codes distributed around the circumference of the first pipe, (b) a measured position of at least two different points on the first pipe, and (c) the shape of the bevelled end of the first pipe stored in the memory of the control unit; and ascertain a relative movement between the first pipe and the second pipe required to align the first pipe and the second pipe in conformity with a target orientation;

wherein the first pipe has a longitudinal axis and the information provided by reading the at least one of the machine readable codes includes information about the orientation of the bevelled end of the first pipe about the longitudinal axis.

17. A pipe-laying vessel including:

one or more items of pipe holding equipment for holding a free end of a pipeline, pipe handling equipment for moving a pipe towards the free end of the pipeline, a control unit according to claim 16, one or more readers for reading two or more machine readable codes on the pipe and measuring a position of at least two different points on said pipe, wherein the pipe handling equipment is arranged to move the pipe towards the pipeline, under the control of the control unit and with the use of the two or more machine readable codes on the pipe and data stored in the memory of the control unit.

18. The pipe-laying vessel according to claim 17, wherein pipe-laying vessel comprises at least two readers, the at least two readers are provided on a ring structure that in use surrounds an exterior circumference of the pipe, and the ring structure has the at least two readers fixed in position at different spaced-apart locations around the circumference of the pipe, a distance between the spaced-apart locations thus being fixed.

19. The method according to claim 1, wherein the second pipe has a plurality of machine readable codes located at positions distributed around a circumference of the second pipe, and the method comprises:

reading at least one of the machine readable codes on each of the first pipe and the second pipe, measuring a position of at least two different points on each of the first pipe and the second pipe, and determining the position and orientation of the bevelled end of the first pipe relative to the bevelled end of the second pipe with use of: information provided by the machine readable codes so read on each of the first pipe and the second pipe, the measured position of the at least two different points on each pipe, and the shapes of the bevelled ends of the first pipe and the second pipe stored in the memory of the control unit.

20. The method according to claim 1, wherein measuring the position of a point on the first pipe comprises: detecting the shape of a portion of the bevelled end of the first pipe, locating a feature on the bevelled end of the first pipe, and measuring the position of the feature on the bevelled end of the first pipe.

21. A method of aligning a first pipe and a second pipe end-to-end in a position ready for welding, wherein at least the first pipe has a plurality of machine readable codes located at positions distributed around a circumference of the first pipe, and the method comprises the following steps:

using a scanner to ascertain a shape of a bevelled end of the first pipe and a shape of a bevelled end of the second pipe, and storing said shapes in a memory of a control unit;

ascertaining a circumferential position of a longitudinal seam on the first pipe, whereby the circumferential position of the longitudinal seam is related to a circumferential position of at least one of the machine readable codes;

effecting relative movement of the bevelled end of the first pipe and the bevelled end of the second pipe towards each other;

while the bevelled ends are spaced apart:

reading at least one of the machine readable codes with a reader, measuring a position of at least two different points on the first pipe, and determining a position and orientation of the bevelled end of the first pipe with the use of: (a) information provided by reading the at least one machine readable code with the reader, (b) the measured position of the at least two different points, and (c) the shape of the bevelled end of the first pipe stored in the memory of the control unit; and ascertaining, with use of the control unit, a relative movement between the first pipe and the second pipe required to align the first pipe and the second pipe in accordance with a target orientation that aligns the first pipe and the second pipe for welding.

\* \* \* \* \*